(12) United States Patent
Yoshino et al.

(10) Patent No.: US 11,707,756 B2
(45) Date of Patent: Jul. 25, 2023

(54) COATING SYSTEM HAVING PLURALITY OF COATING ROBOTS AND OPERATION ROBOT HAVING FIVE ARMS AND TIP JIG

(71) Applicant: KABUSHIKI KAISHA YASKAWA DENKI, Kitakyushu (JP)

(72) Inventors: Katsuhiko Yoshino, Kitakyushu (JP); Satoshi Sueyoshi, Kitakyushu (JP); Takahiro Umezaki, Kitakyushu (JP); Tsuyoshi Ito, Kitakyushu (JP)

(73) Assignee: KABUSHIKI KAISHA YASKAWA DENKI, Kitakushu (JP)

( * ) Notice: Subject to any disclaimer, the term of this patent is extended or adjusted under 35 U.S.C. 154(b) by 170 days.

(21) Appl. No.: 17/143,162

(22) Filed: Jan. 7, 2021

(65) Prior Publication Data

US 2021/0146393 A1 May 20, 2021

Related U.S. Application Data

(63) Continuation of application No. 15/888,084, filed on Feb. 5, 2018, now abandoned.

(30) Foreign Application Priority Data

Feb. 9, 2017 (JP) ................................. 2017-022157

(51) Int. Cl.
*B05B 13/04* (2006.01)
*B05B 16/20* (2018.01)
(Continued)

(52) U.S. Cl.
CPC ...... *B05B 13/0452* (2013.01); *B05B 13/0431* (2013.01); *B05B 16/20* (2018.02);
(Continued)

(58) Field of Classification Search
CPC .................................................. B05B 13/0452
(Continued)

(56) References Cited

U.S. PATENT DOCUMENTS 4,239,431 A 12/1980 Davini
4,498,414 A 2/1985 Kiba et al.
(Continued)

FOREIGN PATENT DOCUMENTS

CN 101965288 2/2011
CN 102596423 7/2012
(Continued)

OTHER PUBLICATIONS

Chinese Office Action for corresponding CN Application No. 201810121819.1, dated Dec. 15, 2020.
(Continued)

*Primary Examiner* — Karl Kurple
(74) *Attorney, Agent, or Firm* — Mori & Ward, LLP

(57) ABSTRACT

A coating system includes coating robots configured to coat a vehicle, and an operation robot. The operation robot includes a first arm configured to turn around a first axis; a second arm configured to turn around a second axis parallel to the first axis; a third arm configured to turn around a third axis parallel to the first axis; a fourth arm configured to turn around a fourth axis perpendicular to the first axis; a fifth arm configured to turn around a fifth axis parallel to the fourth axis; and a tip jig is supported at the fifth arm and is configured to turn around a sixth axis. The sixth axis is selectively parallel to the fifth axis or perpendicular to a plane which includes the fourth axis and the fifth axis.

12 Claims, 16 Drawing Sheets

(51) Int. Cl.
| | |
|---|---|
| *B25J 9/04* | (2006.01) |
| *B25J 5/02* | (2006.01) |
| *B05B 16/40* | (2018.01) |
| *B05C 13/02* | (2006.01) |
| *B25J 9/00* | (2006.01) |
| *B25J 11/00* | (2006.01) |
| *B25J 15/00* | (2006.01) |
| *B05D 1/02* | (2006.01) |
| *B05C 15/00* | (2006.01) |
| *B05B 16/00* | (2018.01) |

(52) U.S. Cl.
CPC .............. *B05B 16/40* (2018.02); *B05C 13/02* (2013.01); *B25J 5/02* (2013.01); *B25J 9/0084* (2013.01); *B25J 9/042* (2013.01); *B25J 9/044* (2013.01); *B25J 9/046* (2013.01); *B25J 11/0075* (2013.01); *B25J 15/0014* (2013.01); *B05B 16/95* (2018.02); *B05C 15/00* (2013.01); *B05D 1/02* (2013.01); *B25J 15/0019* (2013.01); *Y10S 55/46* (2013.01); *Y10S 118/07* (2013.01); *Y10S 901/43* (2013.01)

(58) Field of Classification Search
USPC ..................................................... 427/427.2
See application file for complete search history.

(56) References Cited

U.S. PATENT DOCUMENTS

| | | | |
|---|---|---|---|
| 4,630,567 | A | 12/1986 | Bambousek et al. |
| 4,702,666 | A | 10/1987 | Iwao et al. |
| 4,714,044 | A | 12/1987 | Kikuchi et al. |
| 4,721,630 | A * | 1/1988 | Takeo ................ B05B 13/06 427/427.2 |
| 4,768,462 | A | 9/1988 | Kuronaga et al. |
| 5,127,363 | A | 7/1992 | Nakamura et al. |
| 5,949,209 | A | 9/1999 | Okamoto et al. |
| 6,328,799 | B1 | 12/2001 | Inoue et al. |
| 7,622,158 | B2 | 11/2009 | Clifford et al. |
| 2006/0292308 | A1 | 12/2006 | Clifford et al. |
| 2008/0060575 | A1 | 3/2008 | Meissner |
| 2009/0132088 | A1 | 5/2009 | Taitler |
| 2009/0320753 | A1 | 12/2009 | Yoshino et al. |
| 2010/0030381 | A1 | 2/2010 | Clifford et al. |
| 2011/0020561 | A1 | 1/2011 | Tani |
| 2011/0022228 | A1 | 1/2011 | Mikurube et al. |
| 2012/0260854 | A1 | 10/2012 | Takebe et al. |
| 2012/0325142 | A1 | 12/2012 | Takahashi |
| 2014/0069335 | A1 | 3/2014 | Bania et al. |
| 2014/0220249 | A1 | 8/2014 | Rouaud |
| 2016/0068793 | A1 | 3/2016 | Maggiore |
| 2016/0089779 | A1 | 3/2016 | Hahakura et al. |

FOREIGN PATENT DOCUMENTS

| | | |
|---|---|---|
| CN | 103769332 | 5/2014 |
| DE | 3601437 | 7/1986 |
| DE | 10 2013 109 867 | 3/2014 |
| EP | 1000667 | 5/2000 |
| JP | 2000-167451 | 6/2000 |
| JP | 2000-202337 | 7/2000 |
| JP | 2009-214227 | 9/2009 |
| JP | 2011-098299 | 5/2011 |
| JP | 2014-061589 | 4/2014 |
| WO | WO 2008/108401 | 9/2008 |

OTHER PUBLICATIONS

Office Action issued by the United States Patent and Trademark Office for the parent U.S. Appl. No. 15/888,084, filed Jan. 27, 2021.
Office Action with Form PTO-892 Notice of References Cited issued by the United States Patent and Trademark Office for the parent U.S. Appl. No. 15/888,084, filed Oct. 1, 2018.
Office Action with Form PTO-892 Notice of References Cited issued by the United States Patent and Trademark Office for the parent U.S. Appl. No. 15/888,084, filed Feb. 28, 2019.
Office Action issued by the United States Patent and Trademark Office for the parent U.S. Appl. No. 15/888,084, filed May 21, 2019.
Office Action with Form PTO-892 Notice of References Cited issued by the United States Patent and Trademark Office for the parent U.S. Appl. No. 15/888,084, filed Nov. 8, 2019.
Office Action issued by the United States Patent and Trademark Office for the parent U.S. Appl. No. 15/888,084, filed Mar. 27, 2020.
Office Action issued by the United States Patent and Trademark Office for the parent U.S. Appl. No. 15/888,084, filed Jun. 15, 2020.
Office Action issued by the United States Patent and Trademark Office for the parent U.S. Appl. No. 15/888,084, filed Oct. 6, 2020.
German Office Action for corresponding DE Application No. 10 2018 202 031.0, May 4, 2021 (w/ English machine translation).
Office Action with Form PTO-892 Notice of References Cited issued by the United States Patent and Trademark Office for the parent U.S. Appl. No. 15/888,084, filed Sep. 1, 2021.
Office Action with Form PTO-892 Notice of References Cited issued by the United States Patent and Trademark Office for the parent U.S. Appl. No. 15/888,084, filed Feb. 9, 2022.

* cited by examiner

US 11,707,756 B2

COATING SYSTEM HAVING PLURALITY OF COATING ROBOTS AND OPERATION ROBOT HAVING FIVE ARMS AND TIP JIG

CROSS-REFERENCE TO RELATED APPLICATION

This application is a continuation application of the U.S. patent application Ser. No. 15/888,084, filed on Feb. 5, 2018, which claims priority under 35 U.S.C. § 119 to Japanese Patent Application No. 2017-022157 filed with the Japan Patent Office on Feb. 9, 2017, the entire contents of which are hereby incorporated by reference.

BACKGROUND

1. Technical Field

Embodiments of the disclosure relate to a coating system and a fixed-type operation robot.

2. Description of the Related Art

A typically known coating system conveys, by a conveyor, an object to be coated such as a vehicle in a coating booth having a space isolated from outside. A robot coats the object to be coated during conveyance.

As such coating system, there has been provided the following system (for example, see WO 2008/108401). In this system, a first travel guide rail and a second travel guide rail with a height different from one another are installed in the coating booth along a conveyor. A mobile robot is installed in each travel guide rail.

SUMMARY

According to one aspect of the present embodiment, a coating system includes a plurality of coating robots fixed in a coating booth and configured to coat a vehicle conveyed in a conveyance direction, and an operation robot fixed in the coating booth on an upstream side or a downstream side of the plurality of coating robots in the conveyance direction. The operation robot is configured to operate an open/close member provided at a front or a rear portion of the vehicle. The operation robot includes a first arm configured to turn around a first axis along a vertical direction; a second arm having a base end side supported at a tip side of the first arm, the second arm being configured to turn around a second axis parallel to the first axis; a third arm having a base end side supported at a tip side of the second arm, the third arm being configured to turn around a third axis parallel to the first axis, the third arm extending downward along the third axis; a fourth arm having a base end side supported at a tip side of the third arm, the fourth arm being configured to turn around a fourth axis perpendicular to the first axis; a fifth arm having a base end side supported at a tip side of the fourth arm, the fifth arm being configured to turn around a fifth axis parallel to the fourth axis; and a tip jig having a base end side attachably/detachably supported at the fifth arm. The tip jig is configured to turn around a sixth axis with respect to the fifth arm. The sixth axis is selectively parallel to the fifth axis or perpendicular to a plane which includes the fourth axis and the fifth axis.

According to another aspect of the present embodiment, an operation robot includes a base fixed to an inside of a coating booth; a first arm having a base end side supported at the base, the first arm being configured to turn around a first axis in a vertical direction; a second arm having a base end side supported at a tip side of the first arm, the second arm being configured to turn around a second axis parallel to the first axis; a third arm having a base end side supported at a tip side of the second arm, the third arm being configured to turn around a third axis parallel to the second axis, the third arm extending downward along the third axis; a fourth arm having a base end side supported at a tip side of the third arm, the fourth arm being configured to turn around a fourth axis perpendicular to the third axis; a fifth arm having a base end side supported at a tip side of the fourth arm, the fifth arm being configured to turn around a fifth axis parallel to the fourth axis; and a tip jig having a base end side attachably/detachably supported at the fifth arm, the tip jig being configured to operate an open/close member provided at a front or a rear portion of a vehicle which is conveyed in a conveyance direction in the coating booth, the tip jig being configured to turn around a sixth axis with respect to the fifth arm, the sixth axis being selectively parallel to the fifth axis or perpendicular to a plane which includes the fourth axis and the fifth axis.

DESCRIPTION OF THE EMBODIMENTS

Figure 1:
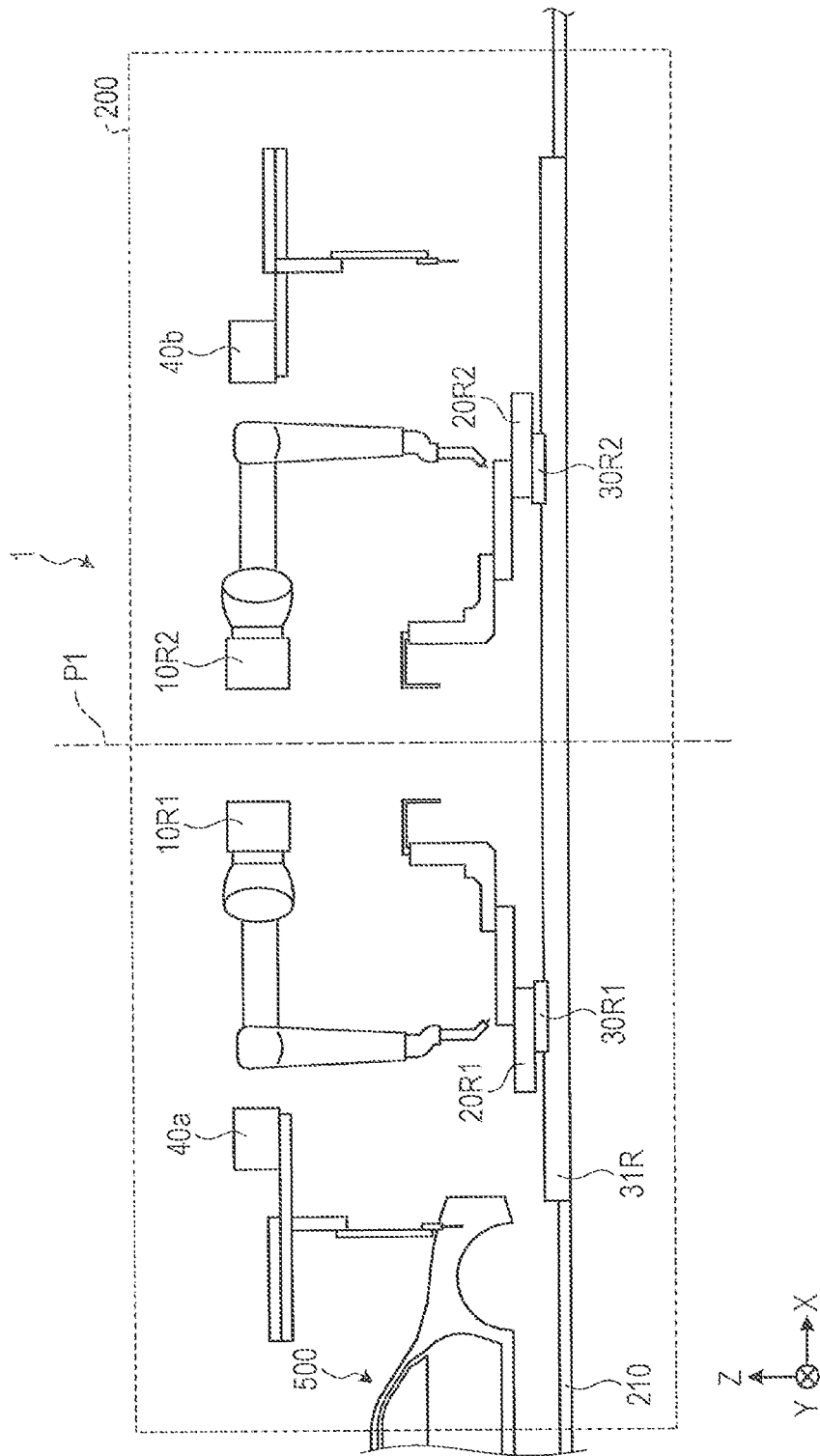
FIG. 1 is a side surface pattern diagram of a coating system according to an embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The following describes embodiments of a coating system and a fixed-type operation robot disclosed in this application in detail with reference to the accompanying drawings. The following embodiments do not limit the technique of this disclosure. The following describes the case where a vehicle such as an automobile is an object to be coated. Note that the object to be coated is not limited to the vehicle.

The following embodiments use expressions such as "horizontal," "parallel," "perpendicular," "vertical," "center," "intermediate," "identical," or "symmetrical." Note that these expressions do not intend to strictly be "horizontal," "parallel," "perpendicular," "vertical," "center," "intermediate," "identical," or "symmetrical." That is, the above-described respective expressions allow discrepancies related to manufacturing accuracy, installation accuracy, and the like.

Figure 2:
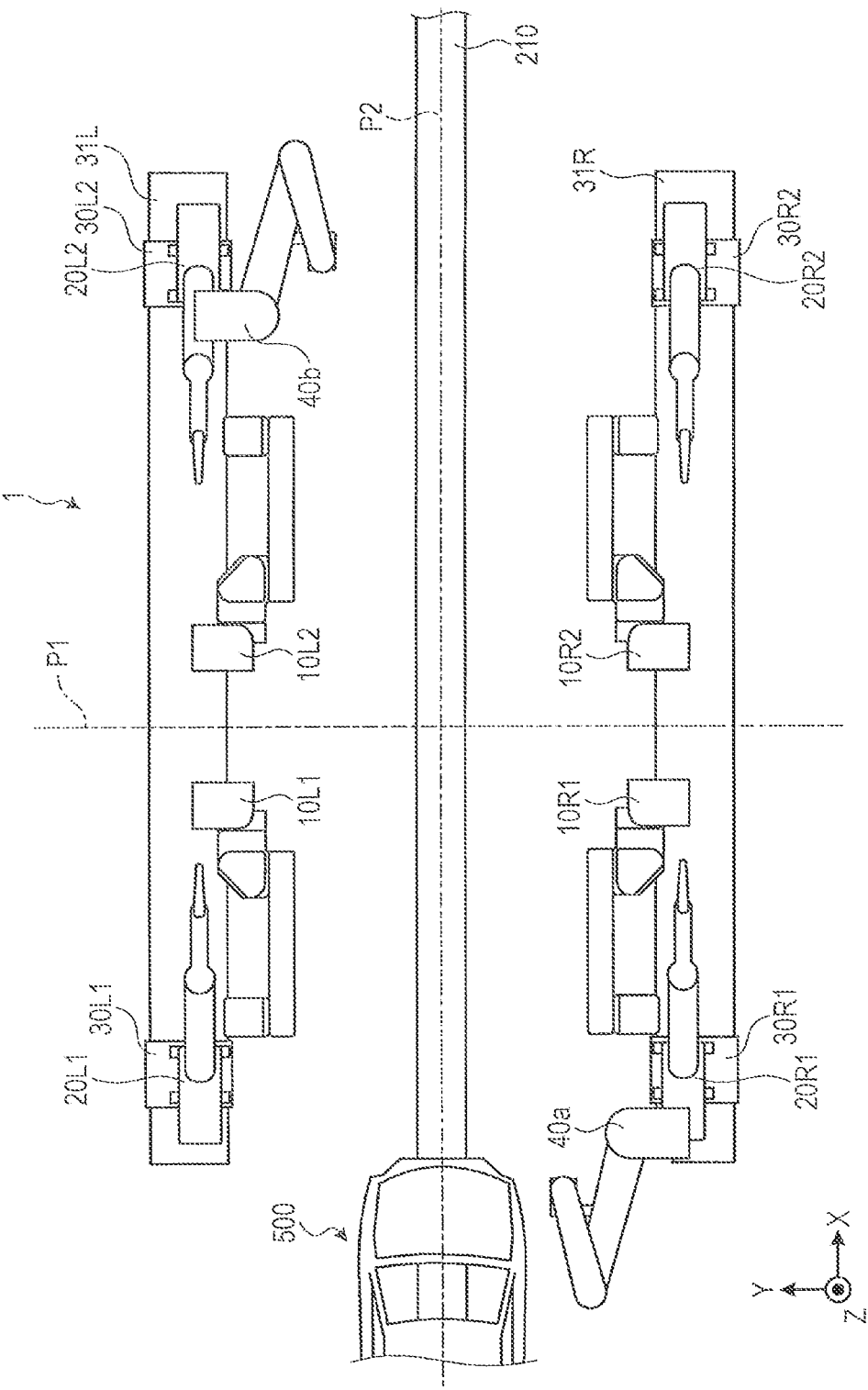
FIG. 2 is a top surface pattern diagram of the coating system according to the embodiment.

First, the following describes a coating system 1 according to this embodiment with reference to FIGS. 1 and 2. FIG. 1 is a side surface pattern diagram of the coating system 1 according to this embodiment. FIG. 2 is a top surface pattern diagram of the coating system 1 according to this embodiment.

Here, FIG. 1 is a side view of a Y-axis positive direction view in FIG. 2. In view of this, the illustrations of a robot and a device hidden behind a device on the front side in the Y-axis positive direction view in FIG. 2 are omitted. Detailed configurations of respective robots illustrated in FIGS. 1 and 2 will be described later with reference to FIGS. 4 and 5.

FIGS. 1 and 2 illustrate a three-dimensional orthogonal coordinate system including a Z-axis whose positive direction is vertically upward in order to make the description clear. This orthogonal coordinate system may be illustrated in other drawings used in the following description.

The following describes a conveyance direction of a conveying device 210 (an X-axis positive direction) as a "front side" or a "downstream side." The inverse direction of the conveyance direction of the conveying device 210 is described as a "back side" or an "upstream side." A right side when facing the conveyance direction of the conveying device 210 is described as a "right side," and similarly the left side is described as a "left side." In the top view, a surface that passes through the center of the conveying device 210 along the conveyance direction of the conveying device 210 is described as a symmetry plane P2 (see FIG. 2). Furthermore, a surface passing through an intermediate position of a pair of coating robots 10R1 and 10R2 and an intermediate position of a pair of coating robots 10L1 and 10L2 is described as a symmetry plane P1 (see FIGS. 1 and 2).

As illustrated in FIGS. 1 and 2, in a coating booth 200, a plurality of robots such as coating robots 10, mobile operation robots 20, and fixed-type operation robots 40 are installed. In view of this, characters for identification are added at ends of reference numerals (10, 20, 30, 31, and 40), which denote a plurality of installed devices such as the robots.

For example, "R" is added to a reference numeral of a device installed on the right side of the conveying device 210 and "L" is added to a reference numeral of a device installed on the left side of the conveying device 210. With a plurality of devices along the conveyance direction, numerals are further added to the reference numerals of the respective devices. For example, the coating robot 10L2 is one of the plurality of coating robots 10 installed to the left side of the conveying device 210 and indicates the coating robot 10 installed downstream side in the conveyance direction in FIG. 2.

The mobile operation robot 20, a traveler 30, and a guide 31 illustrated in FIGS. 1 and 2 may be omitted. That is, the robots in the coating booth 200 may be the coating robots 10 and the fixed-type operation robots 40. This point will be described later with reference to FIG. 11.

Here, a workpiece 500 as the object to be coated has a shape, for example, symmetrical with respect to the symmetry plane P2. However, the workpiece 500 needs not to have the strictly symmetrical shape. The shape of the workpiece 500 is only necessary to be a shape having a symmetry with which the robot on the left side and the robot on the right side of the workpiece 500 perform identical operations.

For the left side of the workpiece 500, the coating robots 10L1 and 10L2 and mobile operation robots 20L1 and 20L2 perform work. For the right side of the workpiece 500, the coating robots 10R1 and 10R2 and mobile operation robots 20R1 and 20R2 perform work. Fixed-type operation robots 40a and 40b operate open/close members provided at portions on the front and the rear of the workpiece 500.

As illustrated in FIG. 2, the workpiece 500 has the symmetrical shape with respect to the symmetry plane P2. In view of this, while mutually performing laterally symmetrical operations, the respective robots opposed across the conveying device 210 coat or operate the workpiece 500. Specifically, the mobile operation robots 20R1 and 20L1, travelers 30R1 and 30L1, the coating robots 10R1 and 10L1, the coating robots 10R2 and 10L2, travelers 30R2 and 30L2, and the mobile operation robots 20R2 and 20L2 mutually perform the laterally symmetrical operations.

The following describes the respective devices such as the robots installed in the coating booth 200 (see FIG. 1). In the coating booth 200, the conveying device 210, for example, two pairs of the travelers 30, and, for example, a pair of the guides 31 is installed. Here, the coating booth 200 is a room for coating that includes a space isolated from outside.

On a floor surface of the coating booth 200, the conveying device 210 such as a conveyor is installed. The conveying device 210 conveys the workpiece 500 as the object to be coated in a predetermined conveyance direction (in the X-axis positive direction in the example illustrated in FIGS. 1 and 2) at a predetermined speed. The workpiece 500 is conveyed in a state of being fixed to a movable part of the conveying device 210 with a jig (not illustrated) and the like.

The pair of guides 31 is installed, for example, at symmetrical positions with respect to the symmetry plane P2 described above on the floor surface of the conveying device 210 (see FIG. 2). As illustrated in FIG. 2, a guide 31R is installed on the right side of the conveying device 210 and a guide 31L is installed on the left side of the conveying device 210. Here, the travelers 30 can travel along the guide 31. That is, the traveler 30 can travel in the X-axis positive direction and in the X-axis negative direction in FIG. 2. The traveler 30 supports the above-described mobile operation robot 20.

As illustrated in FIG. 2, the two travelers 30 are installed at each of the guides 31. That is, the travelers 30R1 and 30R2 are installed on the guide 31R on the right side. The travelers 30L1 and 30L2 are installed on the guide 31L on the left side. Here, the respective travelers 30 can travel independently of one another. That is, the mobile operation robot 20 supported by the traveler 30 is movable independently of one another. The following may designate a member including the mobile operation robot 20 and the traveler 30 as the mobile operation robot 20.

The coating robot 10 is a robot that coats the workpiece 500 and is, for example, a six-axis articulated robot. The coating robot 10 is fixed to a wall surface or a ceiling surface of the coating booth 200. Specifically, the coating robot 10 is fixed to a support pillar, a beam, or the like disposed surrounding the coating booth 200. For example, the wall surface such as an upper wall or a side wall is mounted to an inner portion where the coating robot 10 is fixed. The coating robot 10 increases an internal pressure by introducing gas such as uninflammable gas to the inside to ensure restraining a gas flow from the outside.

Here, as illustrated in FIGS. 1 and 2, the coating robots 10 (the coating robots 10R1 and 10R2) are installed such that a first axis (see A11 in FIG. 4) of the pair of coating robots 10R1 and 10R2 is positioned on an identical straight line parallel to, for example, the conveyance direction.

The pair of coating robots 10R1 and 10R2 is installed such that respective first arms (see 11 in FIG. 4) rotating around the first axis extend to directions separating from one another. The pair of coating robots 10L1 and 10L2 illustrated in FIG. 2 is similarly installed.

Thus installing the coating robots 10 ensures arranging the robots in highly dense. Arranging the robots in highly dense ensures restraining a footprint (an area in the top view) of the coating booth 200. Here, a running cost of the coating booth 200 mainly includes a cost for maintaining the coating environment such as an air conditioning cost and is proportionate to the footprint. Accordingly, arranging the robots in highly dense ensures restraining such running cost.

Furthermore, as illustrated in FIG. 1, in the coating robot 10, an "arm configuration" of the coating robot 10R1 and an "arm configuration" of the coating robot 10R2 are symmetrical with respect to the symmetry plane P1 at the intermediate position of the pair of coating robots 10R1 and 10R2. Here, the "arm configuration" means arrangements of axes provided for each arm to turn or rotate the plurality of arms provided in the coating robot 10. The arrangements of the respective axes include an angle formed by adjacent axes and a distance (a distance between axes) between adjacent axes.

That is, when referred to as the symmetrical "arm configuration," differences in the outer shape or the shape of the arm do not matter. That is, even when the outer shape or the shape of the arms is different, the arm configuration is referred to as symmetrical as long as the arrangement of each of the axes is symmetrical. Similarly, even when the outer shape or the shape of the arms is different, the arm configuration is referred to as identical as long as the arrangement of each of the axes is identical.

Thus, using the pair of coating robots 10R1 and 10R2 having the arm configurations symmetrical to one another ensures using teaching data and inverted teaching data to drive these robots. In view of this, a cost to create the teaching data can be restrained. As a result, the production cost for the robots can be restrained. This point is similar to the pair of coating robots 10L1 and 10L2 illustrated in FIG. 2.

As illustrated in FIG. 2, the coating robots 10 are installed in pairs at positions symmetrical with respect to the symmetry plane P2. That is, the coating robots 10 are installed in pairs at positions symmetrical across the conveying device 210. A first pair of coating robots 10R1 and 10L1 are opposed with respect to the symmetry plane P2. Furthermore, a second pair of coating robots 10R2 and 10L2 are also opposed with respect to the symmetry plane P2. The arm configuration of the coating robot 10R1 and the arm configuration of the coating robot 10L1 are symmetrical with respect to the symmetry plane P2. The arm configuration of the coating robot 10R2 and the arm configuration of the coating robot 10L2 are symmetrical with respect to the symmetry plane P2.

In view of this, the coating robots 10 at diagonally opposite positions in FIG. 2 have the identical arm configuration. That is, the coating robot 10R1 and the coating robot 10L2 have the identical arm configuration. Furthermore, the coating robot 10R2 and the coating robot 10L1 have the identical arm configuration.

Thus arranging the coating robots 10 ensures sharing the above-described teaching data and reusing the teaching data by performing a simple correction. As a result, the workpiece 500 symmetrical with respect to the symmetry plane P2 can be efficiently coated. For example, inverting the direction of the Y-axis in the teaching data for driving the coating robot 10R1 ensures creating the teaching data for driving the coating robot 10L1, and this can be used for driving the coating robot 10L1. The coating robot 10R2 and the coating robot 10L2 are similar in this point.

The mobile operation robot 20 is a robot that operates the open/close member provided in the workpiece 500. Specifically, the mobile operation robot 20 is a three-axis articulated robot and includes a two-axis arm extending and contracting in the horizontal direction and an elevating axis. The mobile operation robot 20 opens and closes doors on side surfaces of the workpiece 500. The mobile operation robot 20 is supported to the above-described traveler 30. In view of this, the mobile operation robot 20 is movable along the guide 31, that is, movable along the conveyance direction of the conveying device 210.

Here, as illustrated in FIG. 1, the mobile operation robot 20 is installed at the position lower than that of the coating robot 10. Thus, installing the mobile operation robot 20 at the position lower than that of the coating robot 10 ensures restraining interference between the coating robot 10 and the mobile operation robot 20. As illustrated in FIG. 1, it is preferable to install the coating robot 10 at a position higher than a height which the mobile operation robot 20 can reach.

Assume that the coating robot 10 heavier than and has a structure more complicated than the mobile operation robot 20 is configured to be mobile, members having a larger withstand load and more complicated are used as the traveler 30 and the guide 31. However, in this embodiment, the mobile operation robot 20 relatively light in weight is moved by the traveler 30 and the guide 31. This ensures simplifying the traveler 30 and the guide 31. As a result, the cost of the coating system 1 can be restrained. Introducing the gas, such as the uninflammable gas, inside the mobile operation robot 20 and the traveler 30 to increase the internal pressure of the mobile operation robot 20 and the traveler 30 ensures restraining the gas flow into the mobile operation robot 20 and the traveler 30 from the outside.

The fixed-type operation robot 40 is a robot that operates the open/close members provided at the portions on the front and the rear of the workpiece 500. The fixed-type operation robot 40 is, for example, the six-axis articulated robot having a horizontal link. The fixed-type operation robot 40 is fixed to the wall surface or the ceiling surface of the coating booth 200 such that the first arm (see 41 in FIG. 6) turns around the first axis along the vertical axis (the Z-axis). The fixed-type operation robot 40 opens and closes the open/close members provided at the portions on the front and the rear of the workpiece 500, such as a hood (520 in FIG. 3) or a tailgate (530 in FIG. 3).

Specifically, as illustrated in FIGS. 1 and 2, the fixed-type operation robot 40a positioned at the upstream side in the conveyance direction opens and closes the tailgate (530 in FIG. 3) of the workpiece 500. The fixed-type operation robot 40b positioned at the downstream side opens and closes the hood (520 in FIG. 3) of the workpiece 500. As illustrated in FIGS. 1 and 2, the fixed-type operation robots 40a and 40b are, for example, each installed at the positions across the coating robots 10R1 and 10R2 along the conveyance direction. Alternatively, for example, the fixed-type operation robot 40a may be provided at the upstream side of the coating robot 10R1 and the fixed-type operation robot 40b may be provided at the downstream side of the coating robot 10L2.

The fixed-type operation robot 40a is installed such that at least a part of the fixed-type operation robot 40a overlaps with an extension range of the guide 31R in the top view (along the conveyance direction). Furthermore, the fixed-type operation robot 40b is installed such that at least a part of the fixed-type operation robot 40b overlaps with an extension range of the guide 31L in the top view (along the conveyance direction). Thus arranging the fixed-type operation robots 40a and 40b ensures keeping the whole length of the coating booth 200 short.

The fixed-type operation robot 40a opens the tailgate by locking the tailgate (530 in FIG. 3) in a closed state and changing a posture of each arm. Then, while changing the postures of the arms so as to follow the conveyed workpiece 500, the fixed-type operation robot 40a holds the tailgate in the open state. Upon the completion of the coating of a portion opened by opening the tailgate, the fixed-type operation robot 40a closes the tailgate. The fixed-type operation robot 40b opens and closes the hood (520 in FIG. 3) by the similar procedure.

Here, the fixed-type operation robot 40 is installed at a position higher than that of the mobile operation robot 20. FIG. 1 illustrates the case where the fixed-type operation robot 40 and the coating robot 10 are installed at an equal height as the example. Instead of this, both the robots may be installed at mutually different heights.

In the examples illustrated in FIGS. 1 and 2, in the direction along the X-axis, the fixed-type operation robot 40a is arranged on the right side of the conveying device 210 and the fixed-type operation robot 40b is arranged on the left side. Thus arranging the fixed-type operation robot 40 easily obtains a strength balance in the right-left direction in the coating booth 200.

The fixed-type operation robot 40a may be arranged on the left side of the conveying device 210 and the fixed-type operation robot 40b may be arranged on the right side. Both of the two fixed-type operation robots 40 may be arranged on the right side of the conveying device 210 or may be arranged on the left side. Furthermore, any one of the fixed-type operation robot 40a and the fixed-type operation robot 40b may be omitted.

In the example illustrated in FIG. 2, the mobile operation robot 20 is arranged at the position far from the conveying device 210 with respect to the coating robot 10 in the direction along the Y-axis. Instead of this, the mobile operation robot 20 may be arranged at a position close to the conveying device 210 with respect to the coating robot 10 in the direction along the Y-axis. The mobile operation robot 20 and the coating robot 10 may be arranged at a position separated from the conveying device 210 by an equal distance.

Figure 3:
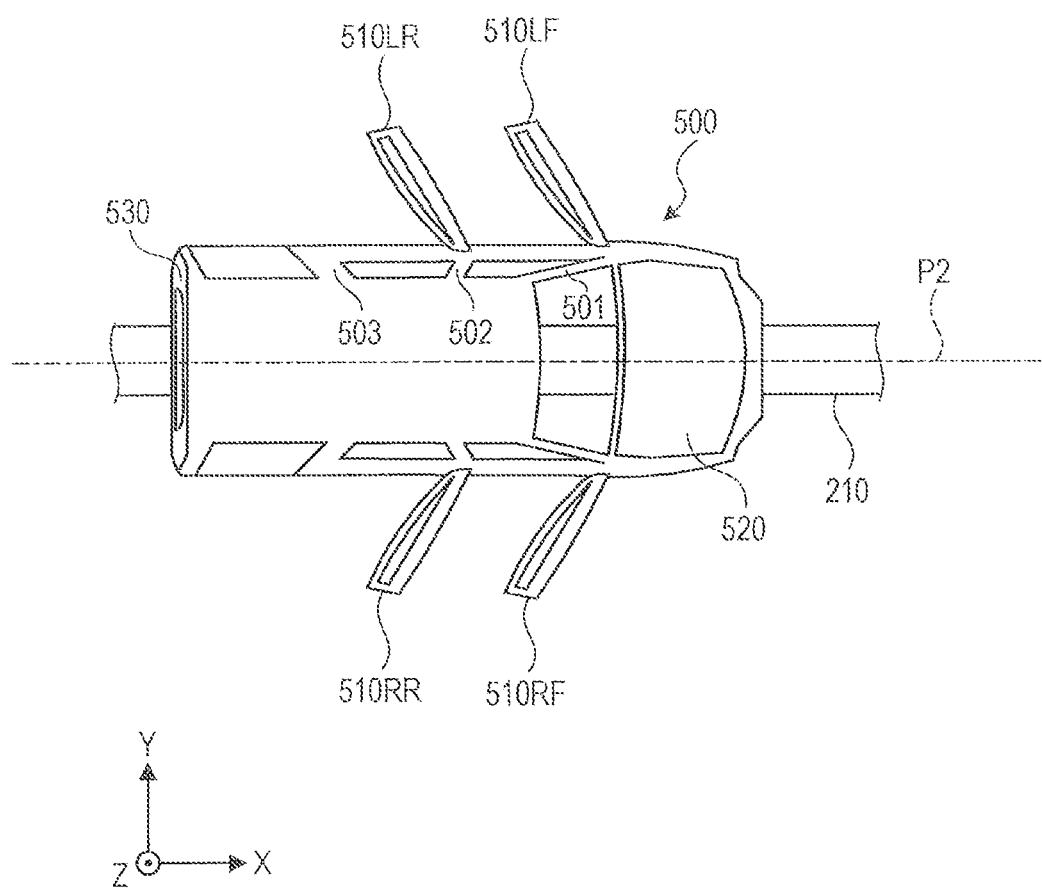
FIG. 3 is an explanatory view of a workpiece.

Next, the following describes a concrete example of the workpiece 500 with reference to FIG. 3. FIG. 3 is an explanatory view of the workpiece 500. FIG. 3 is a top view of the workpiece 500 and illustrates the workpiece 500 whose open/close members on side surfaces are open.

As illustrated in FIG. 3, the workpiece 500 is a so-called four-door vehicle. An interior member, an engine, and the like are not mounted to the workpiece 500. The workpiece 500 is conveyed fixed to the movable part of the conveying device 210. The workpiece 500 includes an A pillar 501, a B pillar 502, and a C pillar 503 from forward to rearward.

Here, with the door at the side surface closed, the B pillar 502 is positioned inside the room of the workpiece 500. In view of this, it can be said that, with the door closed, the B pillar 502 is at the position where performing the coating is difficult. In view of this, the coating system 1 coats the B pillar 502 with the front door and the rear door opened.

The workpiece 500 includes a right front door 510RF and a right rear door 510RR at the side surface on the right side and includes a left front door 510LF and a left rear door 510LR at the side surface on the left side as the open/close members. These doors 510 are opened and closed sideways. The following may designate such open/close members provided at the right and left side surfaces of the workpiece 500 as side surface open/close members. The right front door 510RF, the right rear door 510RR, the left front door 510LF, and the left rear door 510LR may be collectively referred to as the door 510.

The workpiece 500 includes a front open/close member 520 such as the hood on the front and includes a rear open/close member 530 such as the tailgate or a trunk on the rear as the open/close members. The front open/close member 520 and the rear open/close member 530 are opened and closed in the vertical direction.

The following may collectively designate such open/close members provided at the front and rear portions of the workpiece 500 as "front/rear open/close members."

The coating system 1 performs a so-called inner plate coating on the workpiece 500 illustrated in FIG. 3. The coating system 1, that is, coats the portion opened when the above-described open/close member is opened. This portion, for example, includes the above-described B pillar 502, a side surface panel of the workpiece 500, and the insides of the respective doors 510. The specific coating procedure will be described later with reference to FIG. 10.

Figure 4:
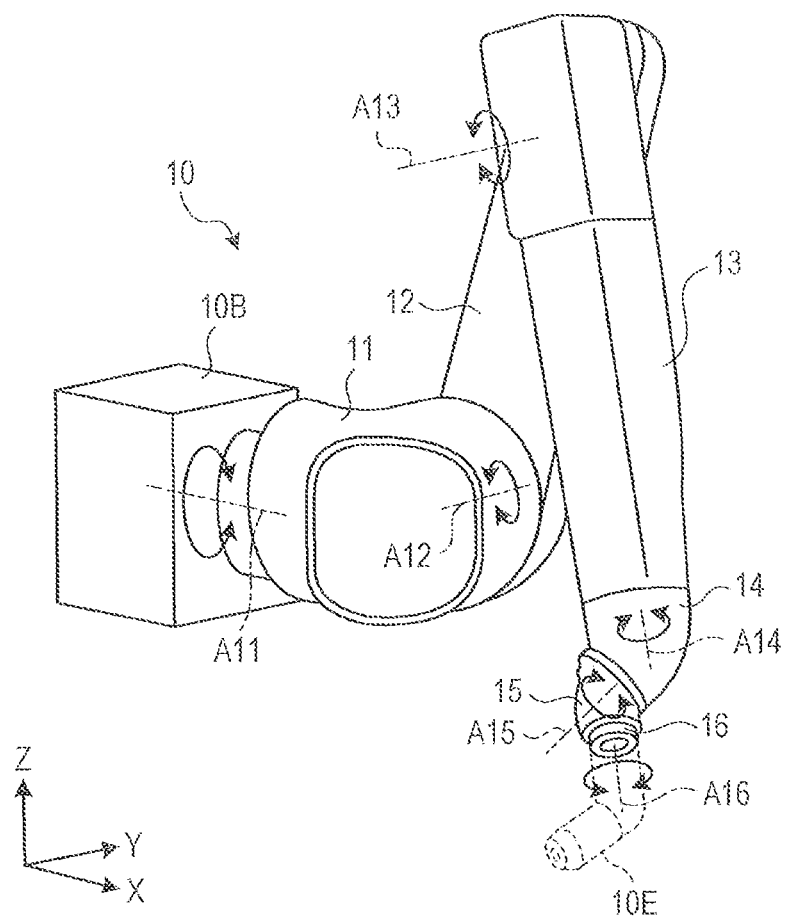
FIG. 4 is a perspective view illustrating a coating robot.

Next, the following describes the configuration of the coating robot 10 with reference to FIG. 4. FIG. 4 is a perspective view illustrating the coating robot 10. Here, the coating robot 10 illustrated in FIG. 4 is equivalent to the coating robot 10R2 illustrated in FIG. 1 and has the arm configuration similar to that of the coating robot 10R2. The coating robot 10R1 illustrated in FIG. 1 has the arm configuration symmetrical to the arm configuration of the coating robot 10 illustrated in FIG. 4.

As illustrated in FIG. 4, the coating robot 10 is a six-axis robot having six rotation axes and has the first axis A11, a second axis A12, a third axis A13, a fourth axis A14, a fifth axis A15, and a sixth axis A16.

The coating robot 10 has joints corresponding to the respective axes. An actuator (not illustrated) as a power source driving the respective joints turns or rotates each arm to change the posture of the coating robot 10. The six-axis robot illustrated in FIG. 4 is one example of the coating robot 10. The coating robot 10 may be a robot having other than six axes.

The coating robot 10 includes a base 10B, a first arm 11, a second arm 12, a third arm 13, a fourth arm 14, a fifth arm 15, and a sixth arm 16 from the base end side to the tip side.

The base 10B is fixed to another member such as the coating booth 200 (see FIG. 1). Here, as illustrated in FIG. 4, the base 10B has a rectangular parallelepiped shape. Among the six surfaces of the base 10B, any of the five surfaces other than the surface on which the first arm 11 is provided can be fixed to a mounting surface of the above-described other member. That is, this base 10B allows the coating robot 10 to be freely arranged.

The base end side of the first arm 11 is supported to the base 10B. The first arm 11 rotates around the first axis A11 in the direction along the X-axis illustrated in FIG. 4. The base end side of the second arm 12 is supported to the tip side of the first arm 11. The second arm 12 turns around the second axis A12 perpendicular to the first axis A11. The base end side of the third arm 13 is supported to the tip side of the second arm 12. The third arm 13 turns around the third axis A13 parallel to the second axis A12.

The base end side of the fourth arm 14 is supported to the tip side of the third arm 13. The fourth arm 14 rotates around the fourth axis A14 perpendicular to the third axis A13. The base end side of the fifth arm 15 is supported to the tip side of the fourth arm 14. The fifth arm 15 rotates around the fifth axis A15, which intersects with the fourth axis A14 inclined at a predetermined angle. The base end side of the sixth arm 16 is supported to the tip side of the fifth arm 15. The sixth arm 16 rotates around the sixth axis A16, which intersects with the fifth axis A15 inclined at a predetermined angle.

To the sixth arm 16, which is the arm at the tip of the coating robot 10, an end effector 10E (illustrated by the dashed line in FIG. 4) such as a paint gun is attachable/detachable. The coating robot 10 has an internal space through which a cable, a tube, or the like to be connected to the end effector 10E is passed. In view of this, these cables and the like can be connected to the end effector 10E without being exposed to the outside.

As the fixed-type operation robots 40a and 40b illustrated in FIG. 1, the robot illustrated in FIG. 4 or a pair of robots having the arm configuration symmetrical to one another can be used. In this case, as the end effector, an aduncate end effector (not illustrated) to lock the front open/close member 520 or the rear open/close member 530 illustrated in FIG. 3 can be used. The details will be described later with reference to FIG. 6.

Figure 5:
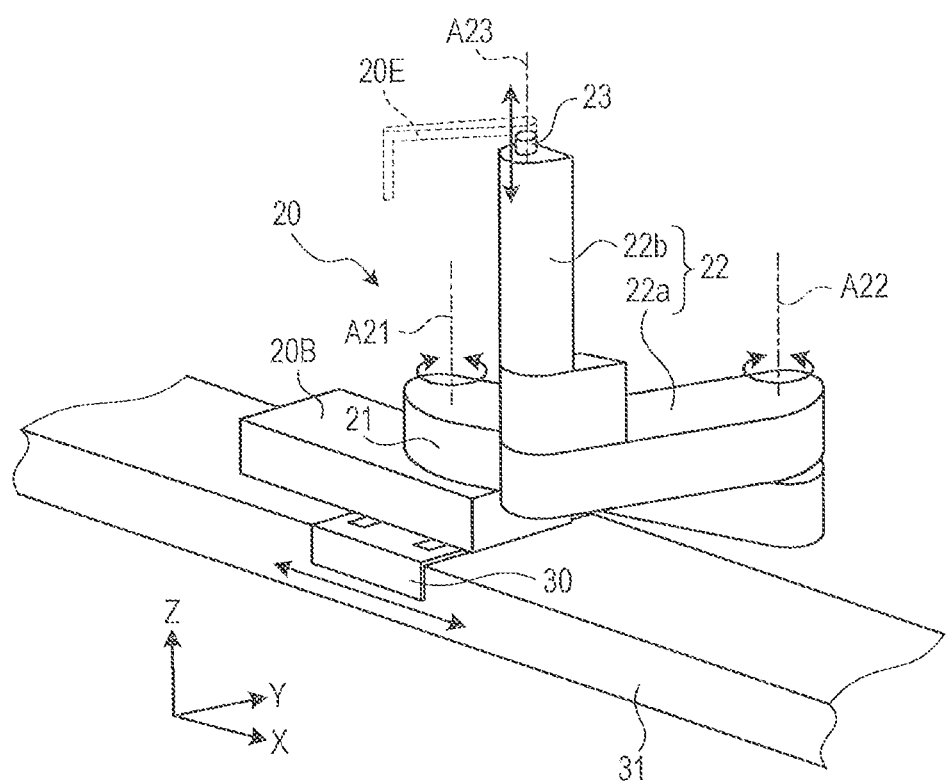
FIG. 5 is a perspective view illustrating a mobile operation robot.

Next, the following describes the configuration of the mobile operation robot 20 with reference to FIG. 5. FIG. 5 is a perspective view illustrating the mobile operation robot 20. As illustrated in FIG. 5, the mobile operation robot 20 is supported to the traveler 30 and is movable in the X-axis positive direction and the X-axis negative direction in FIG. 5 along the guide 31. The mobile operation robot 20 illustrated in FIG. 5 is equivalent to the mobile operation robot 20R1 illustrated in FIG. 1 and is installed in the direction similar to the mobile operation robot 20R1.

As illustrated in FIG. 5, the mobile operation robot 20 is a three-axis robot and has two rotation axes, which are a first axis A21 and a second axis A22, and one elevating axis, which is a third axis A23. The mobile operation robot 20 includes a base 20B, a first arm 21, a second arm 22, and a third arm 23 from the base end side to the tip side.

The base 20B is fixed to the traveler 30. The base end side of the first arm 21 is supported to the base 20B such that the first arm 21 is turnable around the first axis A21 in the vertical direction. The base end side of the second arm 22 is supported to the tip side of the first arm 21 such that the second arm 22 is turnable around the second axis A22 parallel to the first axis A21.

Here, the second arm 22 includes a horizontal extending portion 22a, which horizontally extends, and a vertical extending portion 22b, which extends vertically upward from the tip side of the horizontal extending portion 22a. The vertical extending portion 22b incorporates an elevating mechanism to move up and down the third arm 23.

The third arm 23 is supported to the second arm 22 such that the tip portion of the third arm 23 projects from the top surface of the vertical extending portion 22b of the second arm 22 and moves up and down along the third axis A23. To the third arm 23, the arm at the tip of the mobile operation robot 20, an end effector 20E to lock the open/close member of the workpiece 500 (see FIG. 3) is attachable/detachable.

As illustrated in FIG. 5, the end effector 20E can, for example, have a link shape horizontally extending and having the tip bending downward. Here, in the top view, an angle formed by the end effector 20E in the horizontally extending direction and the second arm 22 in the horizontally extending direction can be fixed to any angle. By configuring the third arm 23 to be rotatable around the third axis A23, the mobile operation robot 20 may be configured as a four-axis robot.

Here, the following describes operations of the mobile operation robot 20. When the door 510 (see FIG. 3) of the workpiece 500 is opened, the mobile operation robot 20 moves the tip of the end effector 20E upward of a space of the door 510 in which a window glass is stored, with the third arm 23 moved up.

The mobile operation robot 20 moves down the third arm 23 to lock the door 510. Next, the mobile operation robot 20 folds the first arm 21 and the second arm 22 to open the door 510. While locking the opened door 510, the mobile operation robot 20 moves on the guide 31 so as to follow the conveyed workpiece 500 (see FIG. 3).

Subsequently, upon the completion of the coating of the relevant portion by the coating robot 10 (see FIG. 4), the mobile operation robot 20 increases the angle formed by the first arm 21 and the second arm 22 to close the door 510. Furthermore, the mobile operation robot 20 moves up the third arm 23 to release the lock on the door 510. Then, the mobile operation robot 20 moves on the guide 31 in a direction opposite to the conveyance direction of the workpiece 500 and returns to a predetermined home position.

FIG. 5 illustrates the example where the one traveler 30 supports the one mobile operation robot 20. Instead of this, the one traveler 30 may support the two mobile operation robots 20. That is, the one traveler 30 may be installed to each pair of the guides 31 and the respective travelers 30 may support the two mobile operation robots 20.

Figure 6:
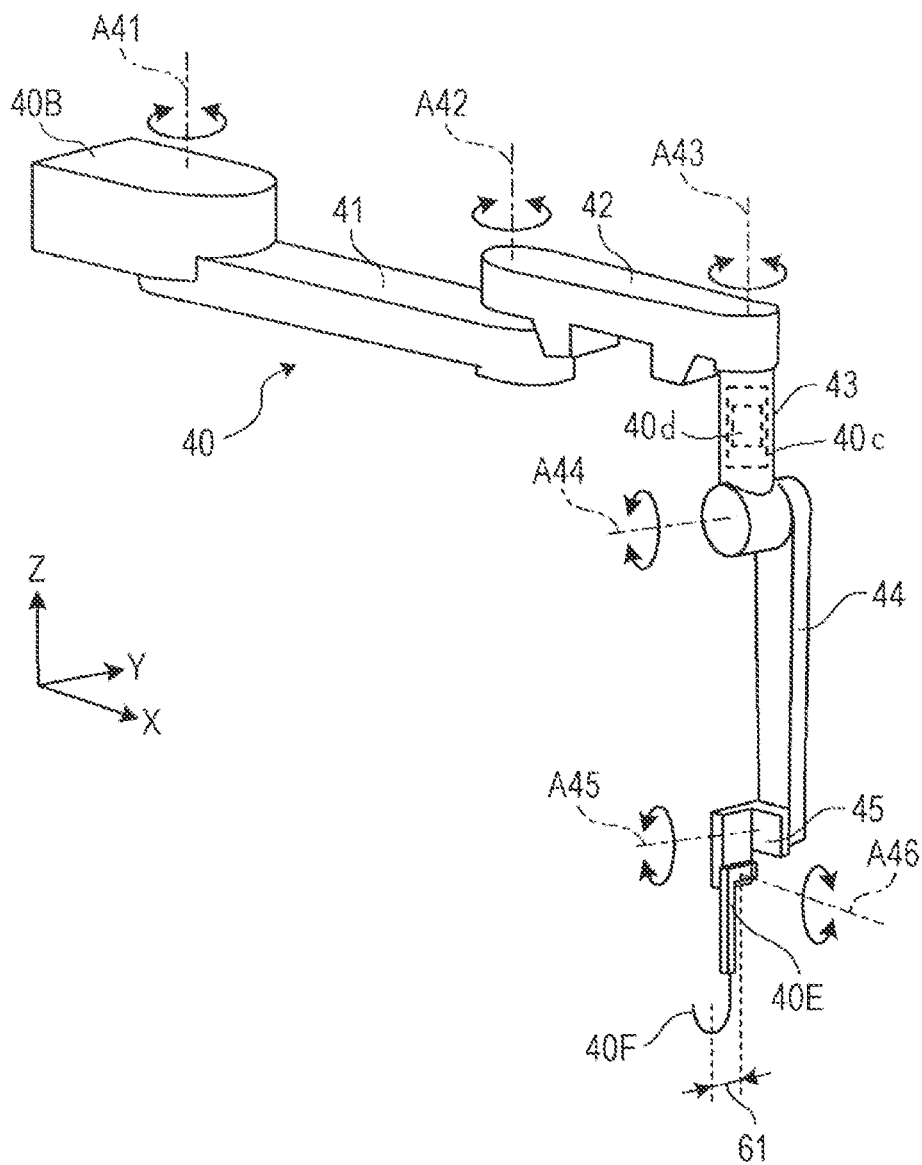
FIG. 6 is a perspective view illustrating a fixed-type operation robot.

Next, the following describes the configuration of the fixed-type operation robot 40 with reference to FIG. 6. FIG. 6 is a perspective view illustrating the fixed-type operation robot 40. Here, the fixed-type operation robot 40 illustrated in FIG. 6 is equivalent to the fixed-type operation robot 40b illustrated in FIG. 1 and is installed in the direction similar to the fixed-type operation robot 40b. The fixed-type operation robot 40a illustrated in FIG. 1 has the arm configuration similar to the arm configuration of the fixed-type operation robot 40b.

As illustrated in FIG. 6, the fixed-type operation robot 40 is the six-axis robot having six rotation axes and has a first axis A41, a second axis A42, a third axis A43, a fourth axis A44, a fifth axis A45, and a sixth axis A46. As described later, the fourth axis A44 and the fifth axis A45 are coordinated by a belt or a closed link mechanism such as a parallel link mechanism. In view of this, the fixed-type operation robot 40 can also be referred to as a robot having five degrees of freedom.

The fixed-type operation robot 40 has joints corresponding to the respective axes. An actuator 40d (see FIG. 9) as a power source driving the respective joints turns or rotates each arm to change the posture of the fixed-type operation robot 40. The six-axis robot illustrated in FIG. 6 is one example of the fixed-type operation robot 40. The fixed-type operation robot 40 may be a robot having other than six axes.

The fixed-type operation robot 40 includes a base 40B, a first arm 41, a second arm 42, a third arm 43, a fourth arm 44, and a fifth arm 45 from the base end side to the tip side. The fixed-type operation robot 40 includes a tip jig 40E attachable/detachable to the fifth arm 45. The base 40B is fixed to another member such as the coating booth 200 (see FIG. 1).

The base end side of the first arm 41 is supported to the base 40B. The first arm 41 turns around the first axis A41 in the direction (the vertical direction) along the Z-axis illustrated in FIG. 6. Thus, the first arm 41 turns around the vertical axis. In view of this, the first arm 41 is less likely to interfere with the coating robot 10 (see FIG. 4) and the coating booth 200 (see FIG. 1). This ensures reducing an installation space of the coating system 1 (see FIG. 1) itself.

The base end side of the second arm 42 is supported to the tip side of the first arm 41. The second arm 42 turns around the second axis A42 parallel to the first axis A41. Thus, the fixed-type operation robot 40 further turns the second arm 42 around the vertical axis, ensuring easily following the conveyed workpiece 500 (see FIG. 1).

Here, the second arm 42 has an arm length shorter than the arm length of the first arm 41. The arm length means the length along the extension direction of each arm. Thus, by shortening the arm length of the second arm 42 than the arm length of the first arm 41, for example, when the fixed-type operation robot 40 takes an evacuation posture, the coupling part of the first arm 41 to the second arm 42 is less likely to interfere with the side wall of the coating booth 200 (see FIG. 1).

The base end side of the third arm 43 is supported to the tip side of the second arm 42. The third arm 43 rotates around the third axis A43 parallel to the second axis A42 and extends downward along the third axis A43. Thus, extending the third arm 43 downward from the second arm 42 allows reducing the height of the coating booth 200 (see FIG. 1).

Figure 9:
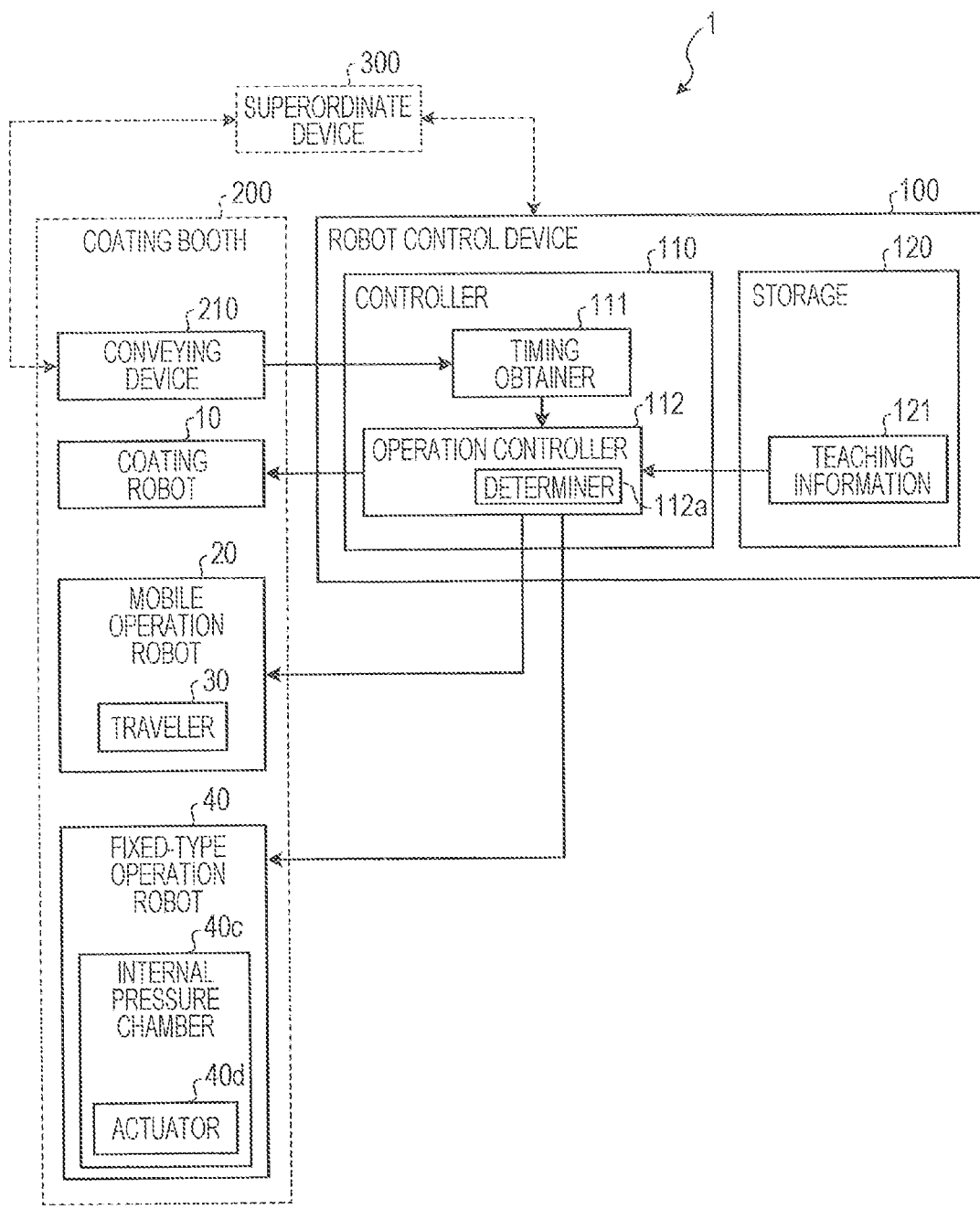
FIG. 9 is a block diagram illustrating a configuration of the coating system.

The base 40B, the first arm 41, the second arm 42, and the third arm 43 internally have an internal pressure chamber 40c (see FIG. 9). The gas such as the uninflammable gas is introduced into the internal pressure chamber 40c to increase the internal pressure. Conversely, since the members closer to the tip side than the fourth arm 44 need not to increase the internal pressure as described later, the internal pressure chamber 40c can be omitted. In view of this, the structure can be simplified.

The base end side of the fourth arm 44 is supported to the tip side of the third arm 43. The fourth arm 44 turns around the fourth axis A44 perpendicular to the third axis A43. The base end side of the fifth arm 45 is supported to the tip side of the fourth arm 44. The fifth arm 45 turns around the fifth axis A45 parallel to the fourth axis A44. The base end side of the tip jig 40E (equivalent to the sixth arm) is attachably/detachably supported to the fifth arm 45. The tip jig 40E turns around the sixth axis A46 in the horizontal direction.

That is, the tip jig 40E turns with respect to the fifth arm 45. The tip jig 40E operates the open/close member provided at the front or the rear portion in the workpiece 500 (see FIG. 1) conveyed in the predetermined conveyance direction in the coating booth 200 (see FIG. 1).

Here, even when the fourth arm 44 turns with respect to the third arm 43, the fifth arm 45 maintains the posture relative to the third arm 43. That is, turning the fourth arm 44 around the fourth axis A44 by "θ degrees" causes the fifth arm 45 to turn around the fifth axis A45 by "-θ degrees."

Thus, even when the posture of the fourth arm 44 changes, the direction of the fifth arm 45 is less likely to change. In view of this, the fixed-type operation robot 40 can smoothly open and close the open/close member while avoiding the interference with the workpiece 500 (see FIG. 1).

The base end side of the tip jig 40E is supported to the fifth arm 45. The tip jig 40E turns around the sixth axis A46 perpendicular to the fifth axis A45. The base end side of the tip jig 40E has a shape extending in the horizontal direction and further bending downward and extending. For example, an aduncate locking part 40F is provided at the tip side of the tip jig 40E. This locking part 40F locks the operation target (the front/rear open/close member).

That is, as illustrated in FIG. 6, in the tip jig 40E, the sixth axis A46 is horizontally offset from the center portion of the locking part 40F in the horizontal direction by an amount of offset 61.

Thus offsetting the sixth axis A46 with the locking part 40F allows easy determination of whether the locking part 40F has locked the operation target or not, that is, whether the locking part 40F has succeeded in the locking of the operation target or not as described later. The base end side of the tip jig 40E may have a shape extending downward and further horizontally bending and extending. The amount of offset 61 may be 0.

As illustrated in FIG. 6, when the sixth axis A46 is perpendicular to the fifth axis A45, the direction of offset of the sixth axis A46 with the locking part 40F becomes the direction along the fourth axis A44 and the fifth axis A45. FIG. 6 illustrates the example where the locking part 40F is offset in the Y-axis negative direction with respect to the sixth axis A46. Instead of this, the locking part 40F may be offset in the Y-axis positive direction with respect to the sixth axis A46. Additionally, the rotation of the mounting direction of the tip jig 40E around the Z-axis by 90 degrees allows the sixth axis A46 to be parallel to the fifth axis A45. In this case, the direction of offset becomes the horizontal direction perpendicular to the fifth axis A45. That is, changing the mounting direction of the tip jig 40E to the fifth arm 45 makes the direction of a turning axis (the sixth axis A46) of the tip jig 40E to the fifth arm 45 changeable.

Thus, by making the tip jig 40E turnable with respect to the fifth arm 45, the relative angle of the tip jig 40E to the operation target is easily fine-adjusted. This ensures efficiently locking the operation target and releasing the locking on the operation target. Making the direction of the sixth axis A46 changeable increases the degree of freedom of the posture of the fixed-type operation robot 40 relative to the operation target.

Based on the output from the power source to turn the tip jig 40E, whether the tip jig 40E has succeeded in the locking of the operation target by the locking part 40F or not can be determined. For example, when the tip jig 40E is moved upward after the lock operation, in the case where a torque holding the posture of the tip jig 40E is larger than a predetermined value, it can be determined that the locking of the operation target has succeeded. As described above, the locking part 40F of the tip jig 40E with the shape offset from the sixth axis A46 can enhance detection sensitivity. Consequently, accuracy of the lock determination can be improved.

The actuator 40d (see FIGS. 6 and 9) as the power source to turn the respective fourth arm 44 and tip jig 40E is arranged inside the third arm 43, for example, in the internal pressure chamber 40c of the third arm 43. The driving power from the power source to turn the fourth arm 44 is transmitted to the fourth arm 44 by the belt and a pulley incorporated into the third arm 43. The fifth arm 45 turns so as to coordinate with the turning of the fourth arm 44.

The driving power from the power source to turn the tip jig 40E is transmitted to the tip jig 40E by the belt and the pulley incorporated into the fourth arm 44 and the fifth arm 45 to turn the tip jig 40E.

Thus, since the fourth arm 44, the fifth arm 45, and the tip jig 40E do not include the driving source, a mechanism to increase the internal pressure may be omitted. Accordingly, the configuration of the fourth arm 44, the fifth arm 45, and the tip jig 40E can be simplified. Instead of the transmission mechanism including the belt and the pulley, a transmission mechanism including a gear and/or a shaft or the like may be used.

With the fixed-type operation robot 40 illustrated in FIG. 6, the fourth arm 44 and the fifth arm 45 are mechanically coordinated. Instead of this, the fixed-type operation robot 40 may be configured such that the fourth arm 44 and the fifth arm 45 operate independent of each other. In this case, the fourth arm 44 and the fifth arm 45 may be controlled so as to perform the above-described coordinated operation.

Next, the following describes the operation example of the fixed-type operation robot 40a on the upstream side illustrated in FIG. 1 with reference to FIGS. 7A to 7E. FIGS. 7A to 7E each illustrate postures (1) to (5) of the fixed-type operation robot 40a on the upstream side. FIGS. 7A to 7D illustrate examples where the tip jig 40E is moved along the symmetry plane P2 illustrated in FIG. 2. Instead of this, the tip jig 40E may be moved on any plane parallel to the symmetry plane P2. In FIGS. 7A to 7D, assume that the sixth axis A46 illustrated in FIG. 6 is held to be perpendicular to the symmetry plane P2.

Figure 7A:
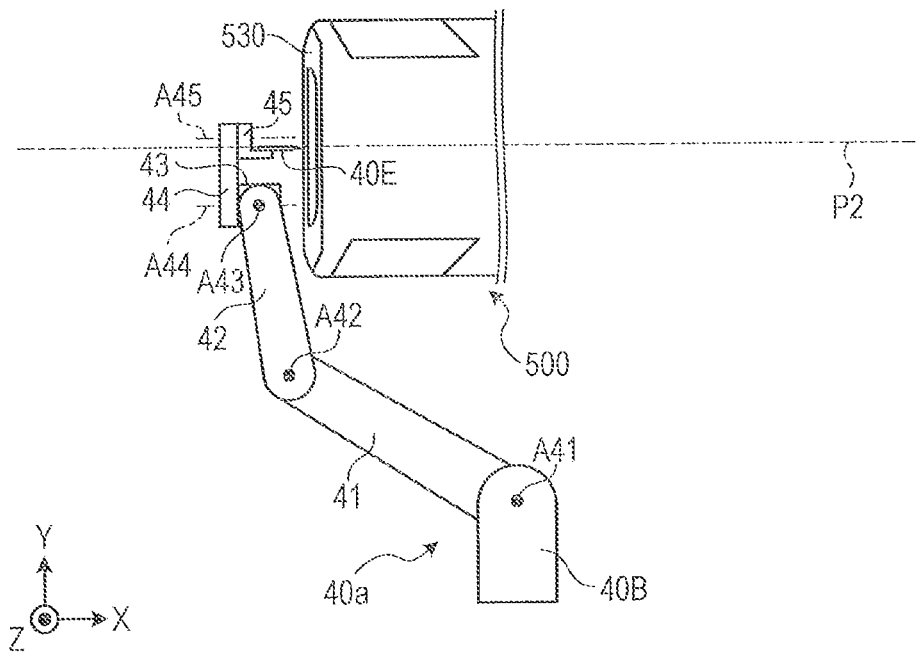
FIG. 7A illustrates a posture of the fixed-type operation robot on an upstream side (1)

FIG. 7A illustrates the posture of the fixed-type operation robot 40a that accesses the closed rear open/close member 530. As illustrated in FIG. 7A, the fixed-type operation robot 40a turns the first arm 41 and the second arm 42 to access the rear open/close member 530 from the upstream side.

Here, on the fourth arm 44, the fourth axis A44 takes a posture perpendicular to the symmetry plane P2 on the upstream side with respect to the third axis A43. This ensures making the fourth arm 44 away from the rear open/close member 530. As a result, the interference of the fourth arm 44 with the rear open/close member 530 can be restrained. The fourth arm 44 illustrated in FIG. 7A takes a posture where the tip side is inclined obliquely downward.

Figure 7B:
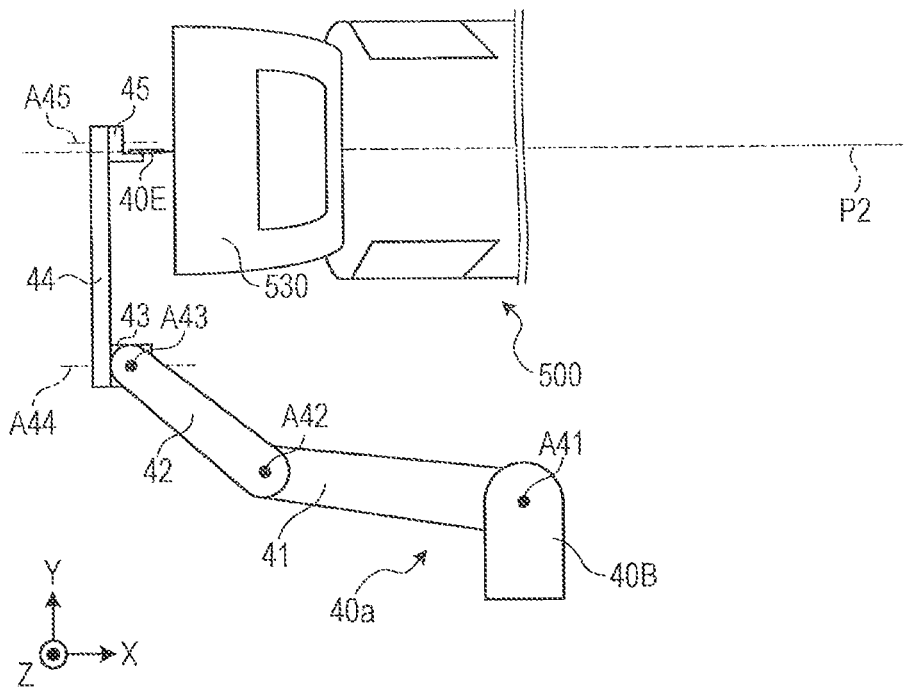
FIG. 7B illustrates a posture of the fixed-type operation robot on the upstream side (2)

FIG. 7B illustrates the posture of the fixed-type operation robot 40a where the rear open/close member 530 is held to be the open state. As illustrated in FIG. 7B, the fixed-type operation robot 40a turns the fourth arm 44 to a direction where the tip side is moved up compared with FIG. 7A. Furthermore, the fixed-type operation robot 40a turns the first arm 41 and the second arm 42 such that the tip jig 40E is held on the symmetry plane P2.

Furthermore, the fixed-type operation robot 40a causes the third arm 43 to coordinate with these operations to rotate around the third axis A43, thus holding the fourth axis A44 parallel to the symmetry plane P2. As already described with reference to FIG. 6, even if the fourth arm 44 is turned, the relative posture between the third arm 43 and the fifth arm 45 is maintained.

Figure 7C:
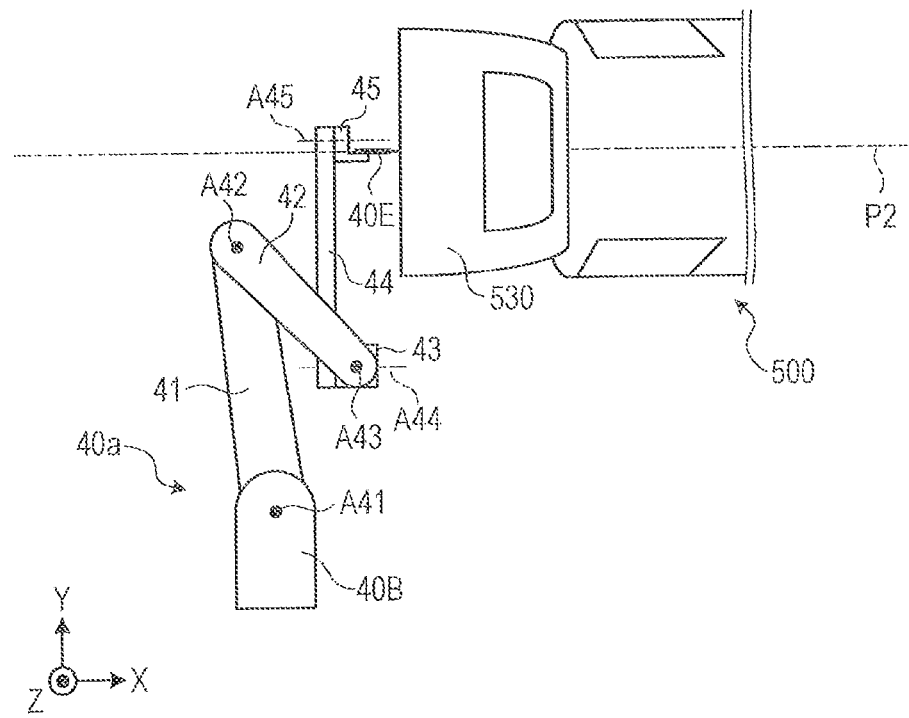
FIG. 7C illustrates a posture of the fixed-type operation robot on the upstream side (3)

FIG. 7C illustrates an example of the posture of the fixed-type operation robot 40a following the conveyed workpiece 500 with the rear open/close member 530 open. As illustrated in FIG. 7C, the fixed-type operation robot 40a causes the respective rotation axes to coordinate with one another such that the tip jig 40E moves the downstream side on the symmetry plane P2. The tip jig 40E has a height maintained to be a height illustrated in FIG. 7B.

Figure 7D:
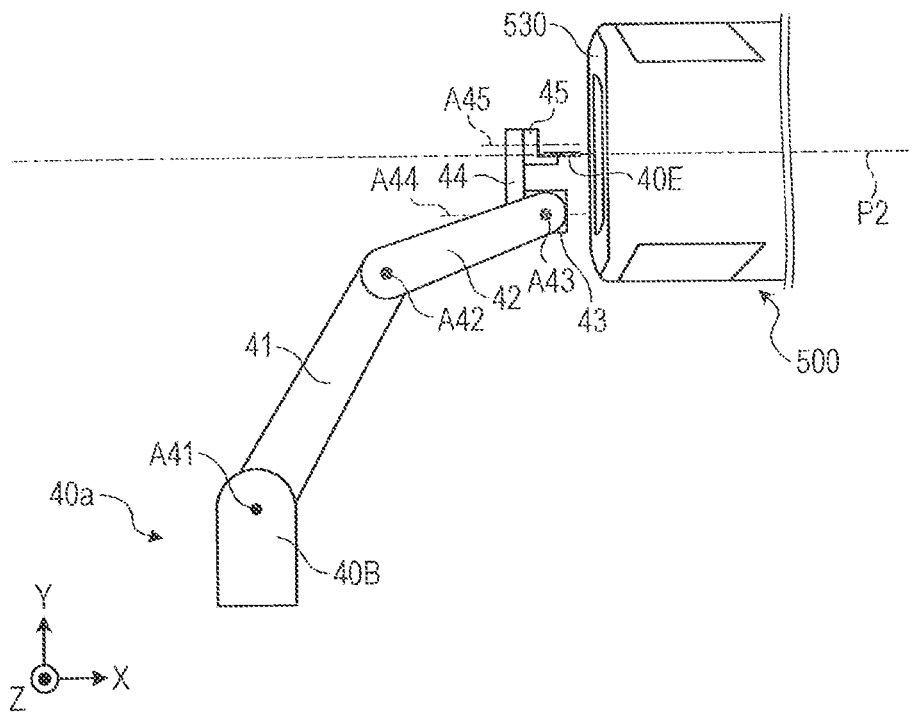
FIG. 7D illustrates a posture of the fixed-type operation robot on the upstream side (4)

FIG. 7D illustrates the posture of the fixed-type operation robot 40a where the rear open/close member 530 is returned to the closed state. As illustrated in FIG. 7D, the fixed-type operation robot 40a turns the fourth arm 44 to a direction where the tip side of the fourth arm 44 is moved down compared with a position illustrated in FIG. 7C. Furthermore, the fixed-type operation robot 40a turns the first arm 41 and the second arm 42 such that the tip jig 40E is held on the symmetry plane P2. Furthermore, the fixed-type operation robot 40a causes the third arm 43 to coordinate with these operations to rotate around the third axis A43, thus holding the fourth axis A44 parallel to the symmetry plane P2.

Figure 7E:
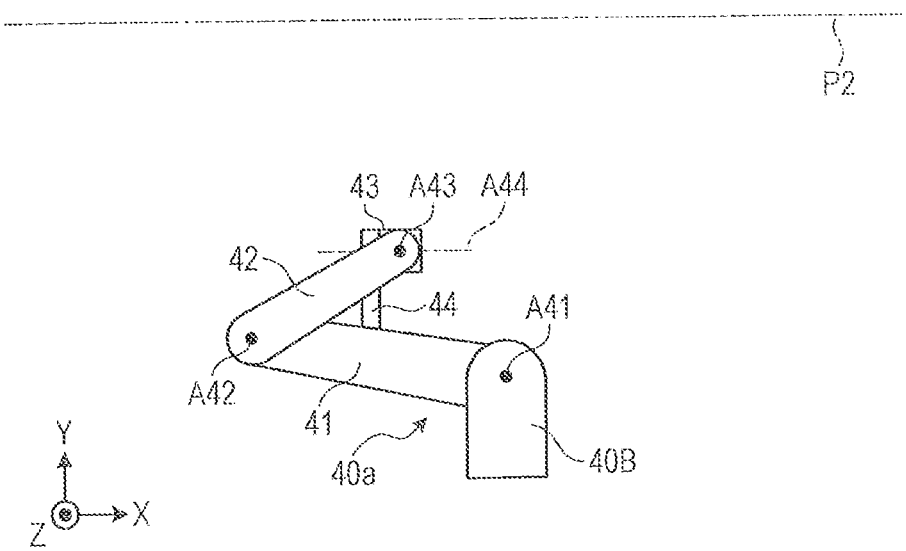
FIG. 7E illustrates a posture of the fixed-type operation robot on the upstream side (5)

FIG. 7E illustrates an example of the posture of the fixed-type operation robot 40a on the home position. As illustrated in FIG. 7E, the fixed-type operation robot 40a turns the tip side of the fourth arm 44 downward to the side opposite to the symmetry plane P2 and takes a posture of folding the first arm 41 and the second arm 42. This secures the fixed-type operation robot 40a having a distance between the fixed-type operation robot 40a and the symmetry plane P2.

Accordingly, the interference of the fixed-type operation robot 40a with the workpiece 500 can be restrained. The fixed-type operation robot 40a can take the posture illustrated in FIG. 7E on a previous step of the posture illustrated in FIG. 7A and a latter step of the posture illustrated in FIG. 7D. Thus, the fixed-type operation robot 40a accesses the workpiece 500 from the upstream side in the conveyance direction. Accordingly, the fixed-type operation robot 40a can smoothly perform the operation to open the rear open/close member 530, the operation to maintain the open state of the rear open/close member 530, and the operation to close the rear open/close member 530.

Next, the following describes an operation example of the fixed-type operation robot 40b on the downstream side illustrated in FIG. 1 with reference to FIGS. 8A to 8E. FIGS. 8A to 8E each illustrate postures (1) to (5) of the fixed-type operation robot 40b on the downstream side. FIGS. 8A to 8D illustrate examples where the tip jig 40E is moved along the symmetry plane P2 illustrated in FIG. 2. Instead of this, the tip jig 40E may be moved on any plane parallel to the symmetry plane P2. In FIGS. 8A to 8D, assume that the sixth axis A46 illustrated in FIG. 6 is held to be perpendicular to the symmetry plane P2.

Figure 8A:
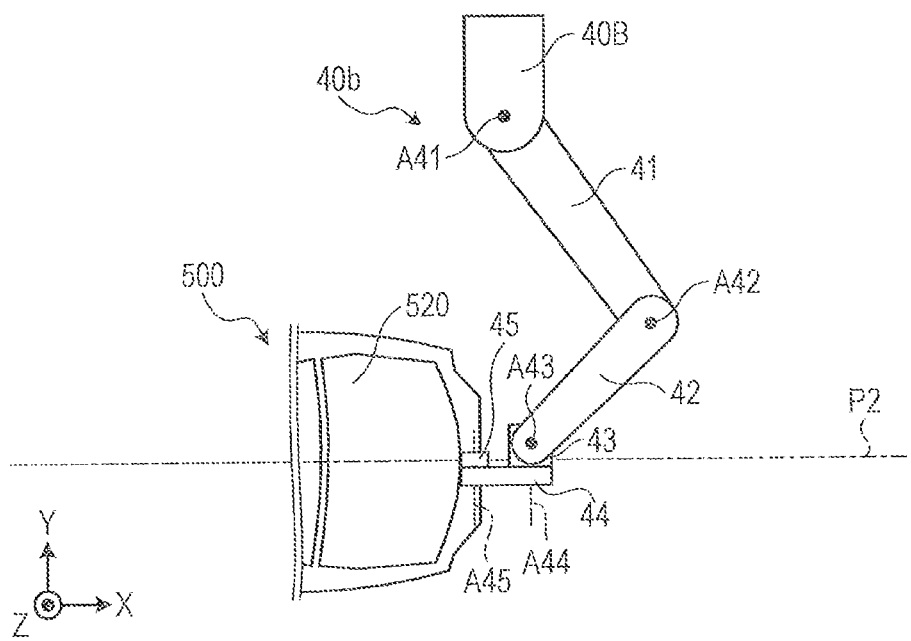
FIG. 8A illustrates a posture of the fixed-type operation robot on a downstream side (1)

FIG. 8A illustrates the posture of the fixed-type operation robot 40b that accesses the front open/close member 520 in a closed state. As illustrated in FIG. 8A, the fixed-type operation robot 40b turns the first arm 41 and the second arm 42 to access the front open/close member 520 from the downstream side.

Here, on the fourth arm 44, the fourth axis A44 takes a posture perpendicular to the symmetry plane P2 at a position far from the base 40B with respect to the third axis A43. Accordingly, the interference of the workpiece 500 with the fixed-type operation robot 40b can be restrained. The fourth arm 44 illustrated in FIG. 8A takes a posture where the tip side is inclined obliquely downward.

Figure 8B:
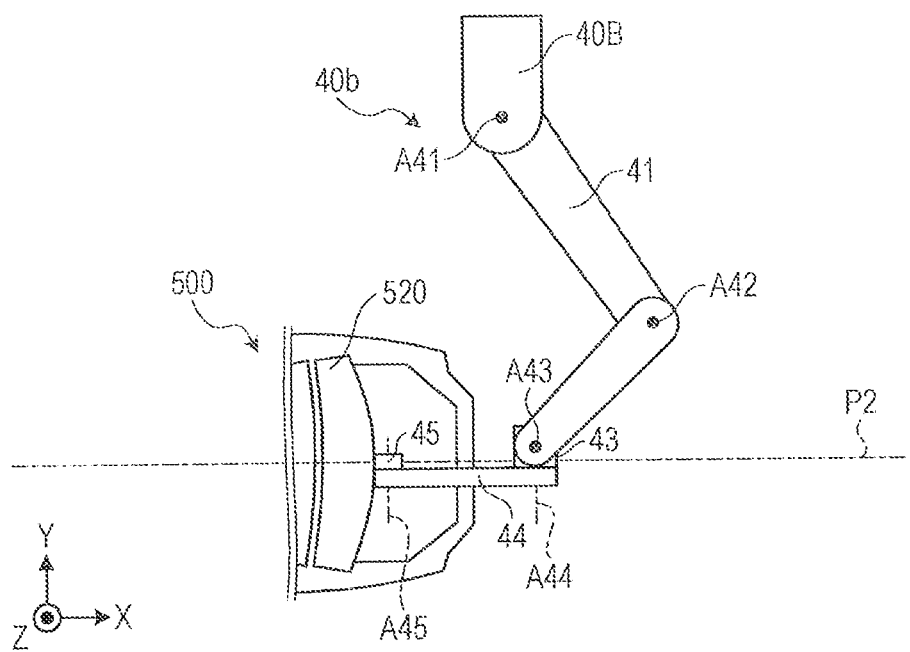
FIG. 8B illustrates a posture of the fixed-type operation robot on the downstream side (2)

FIG. 8B illustrates the posture of the fixed-type operation robot 40b where the front open/close member 520 is held to be the open state. As illustrated in FIG. 8B, the fixed-type operation robot 40b turns the fourth arm 44 to a direction where the tip side is moved up compared with FIG. 8A. Furthermore, the fixed-type operation robot 40b turns the first arm 41 and the second arm 42 such that the tip jig 40E is held on the symmetry plane P2.

Furthermore, the fixed-type operation robot 40b causes the third arm 43 to coordinate with these operations to rotate around the third axis A43, thus holding the fourth axis A44 perpendicular to the symmetry plane P2. As already described with reference to FIG. 6, even if the fourth arm 44 is turned, the relative posture between the third arm 43 and the fifth arm 45 is maintained.

Figure 8C:
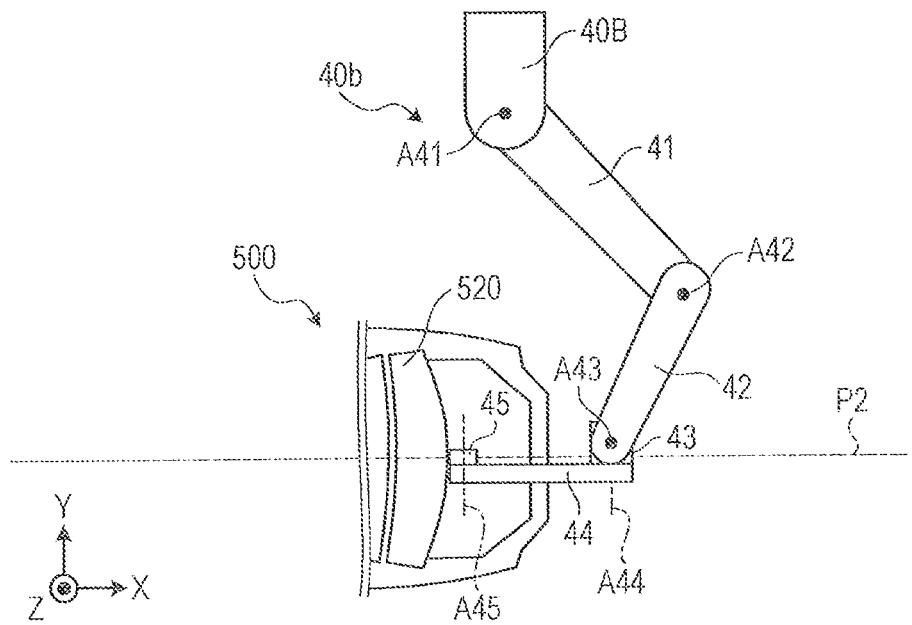
FIG. 8C illustrates a posture of the fixed-type operation robot on the downstream side (3)

FIG. 8C illustrates an example of the posture of the fixed-type operation robot 40b following the conveyed workpiece 500 with the front open/close member 520 open. As illustrated in FIG. 8C, the fixed-type operation robot 40b causes the respective rotation axes to coordinate with one another such that the tip jig 40E moves the downstream side on the symmetry plane P2. The tip jig 40E has a height maintained to be a height illustrated in FIG. 8B.

Figure 8D:
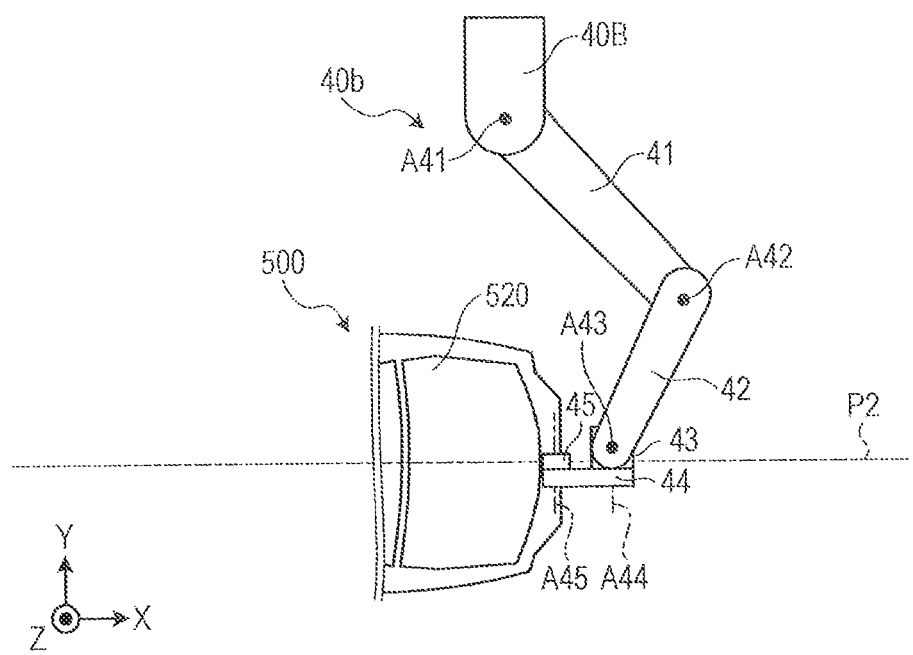
FIG. 8D illustrates a posture of the fixed-type operation robot on the downstream side (4)

FIG. 8D illustrates the posture of the fixed-type operation robot 40b where the front open/close member 520 is returned to the closed state. As illustrated in FIG. 8D, the fixed-type operation robot 40b turns the fourth arm 44 to a direction where the tip side of the fourth arm 44 is moved down compared with the position illustrated in FIG. 8C. Furthermore, the fixed-type operation robot 40b turns the first arm 41 and the second arm 42 such that the tip jig 40E is held on the symmetry plane P2. Furthermore, the fixed-type operation robot 40b causes the third arm 43 to coordinate with these operations to rotate around the third axis A43, thus holding the fourth axis A44 perpendicular to the symmetry plane P2.

Figure 8E:
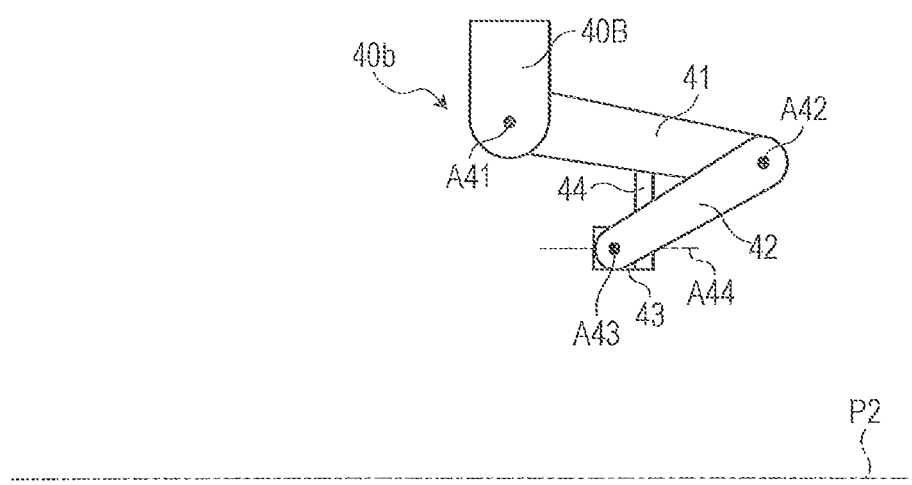
FIG. 8E illustrates a posture (5) of the fixed-type operation robot on the downstream side.

FIG. 8E illustrates an example of the posture of the fixed-type operation robot 40b on the home position. As illustrated in FIG. 8E, the fixed-type operation robot 40b turns the tip side of the fourth arm 44 downward to the side opposite to the symmetry plane P2 and takes a posture of folding the first arm 41 and the second arm 42. This secures the fixed-type operation robot 40b having a distance between the fixed-type operation robot 40b and the symmetry plane P2.

Accordingly, the interference of the fixed-type operation robot 40b with the workpiece 500 can be restrained. The fixed-type operation robot 40b can take the posture illustrated in FIG. 8E on a previous step of the posture illustrated in FIG. 8A and a latter step of the posture illustrated in FIG. 8D. Thus, the fixed-type operation robot 40b accesses the workpiece 500 from the downstream side in the conveyance direction. Accordingly, the fixed-type operation robot 40b can smoothly perform the operation to open the front open/close member 520, the operation to maintain the open state of the front open/close member 520, and the operation to close the front open/close member 520.

Next, the following describes the configuration of coating system 1 according to this embodiment with reference to FIG. 9. FIG. 9 is a block diagram illustrating the configuration of the coating system 1. As illustrated in FIG. 9, the coating system 1 includes the conveying device 210, the coating robot 10, the mobile operation robot 20, and the fixed-type operation robot 40 in the coating booth 200. As described above, the mobile operation robot 20 may be omitted.

The coating system 1 further includes a robot control device 100. The conveying device 210, the coating robot 10, the mobile operation robot 20, and the fixed-type operation robot 40 are connected to the robot control device 100.

The coating system 1 includes a superordinate device 300. The superordinate device 300 controls the entire operation of the conveying device 210 and the robot control device 100. The superordinate device 300 notifies the robot control device 100 of information such as vehicle type information indicative of the type of the workpiece 500 (see FIG. 3). The superordinate device 300 is a device including a computer and various circuits similar to the robot control device 100 described later. Here, this superordinate device 300 may be omitted. In this case, the robot control device 100 may be configured so as to receive the information such as the above-described vehicle type information from the conveying device 210 or a device such as a network-connected terminal.

As already described above, the conveying device 210 is the device such as the conveyor to convey the workpiece 500 in the predetermined conveyance direction. The conveying device 210 includes a detecting device (not illustrated) such as a sensor to detect the position of the workpiece 500. The conveying device 210 notifies the robot control device 100 of a timing of passing of the workpiece 500 or the like. The conveying device 210, for example, conveys the workpiece 500 at a constant speed.

The coating robot 10 is the robot to coat the workpiece 500. In the examples illustrated in FIGS. 1 and 2, the four coating robots 10 are installed in the coating booth 200. Since the configuration of the coating robot 10 has been already explained with reference to FIG. 4, the explanation is omitted here.

The mobile operation robots 20 are the robots that operate the doors 510 (see FIG. 3) as the side surface open/close members among the open/close members of the workpiece 500. In the examples illustrated in FIGS. 1 and 2, the four mobile operation robots 20 are installed in the coating booth 200. FIG. 9 describes the traveler 30 (see FIG. 1) as the member included in the mobile operation robot 20. Since the configuration of the mobile operation robot 20 has been already explained with reference to FIG. 5, the explanation is omitted here.

The fixed-type operation robots 40 are the robots that operate the front/rear open/close members such as the front open/close member 520 and the rear open/close member 530 (see FIG. 3) among the open/close members of the workpiece 500. In the examples illustrated in FIGS. 1 and 2, the two fixed-type operation robots 40 are installed in the coating booth 200. Since the configuration of the fixed-type operation robot 40 has been already explained with reference to FIG. 6, the explanation is omitted here.

The robot control device 100 includes a controller 110 and a storage 120. The controller 110 includes a timing obtainer 111 and an operation controller 112. The storage 120 stores teaching information 121. For simplification of the explanation, FIG. 9 illustrates the one robot control device 100. Instead of this, the coating system 1 may include a plurality of the robot control devices corresponding to the respective coating robots 10 and mobile operation robots 20. In this case, the coating system 1 may include the superordinate robot control device that manages the respective control devices.

Here, the robot control device 100, for example, includes the computer and the various circuits. The computer, for example, includes a central processing unit (CPU), a read only memory (ROM), a random access memory (RAM), a hard disk drive (HDD), input/output ports, and the like.

The CPU in the computer, for example, reads a program stored in the ROM and executes this program to function as the timing obtainer 111 and the operation controller 112 in the controller 110.

At least any one of or all the timing obtainer 111 and the operation controller 112 can be configured as hardware such as an application specific integrated circuit (ASIC) or a field programmable gate array (FPGA).

The storage 120, for example, corresponds to the RAM and/or the HDD. The RAM and the HDD can store the teaching information 121. The robot control device 100 may be configured so as to obtain the above-described program and/or various pieces of information via another computer coupled over wired or wireless network or a portable storage medium. Furthermore, as described above, the coating system 1 may be configured to include the plurality of robot control devices 100 communicable with one another. Alternatively, the robot control devices 100 may be configured as hierarchical devices communicable with the upper or the lower device.

While the controller 110 obtains location information (a pulse signal) of a tool such as a base to fix the workpiece 500 (see FIG. 3) to the movable part of conveying device 210 and/or an interlock signal to exclusively operate each device from the conveying device 210, the controller 110 performs the operation control on each robot. With the plurality of robot control devices 100, the controller 110 performs a process to synchronize the robot control devices 100 together.

The timing obtainer 111 obtains the above-described location information and/or interlock signal from the conveying device 210. The timing obtainer 111 determines the operation timing of each robot according to the obtained location information and/or interlock signal. The timing obtainer 111 notifies the operation controller 112 of the determined operation timing. For example, the timing obtainer 111 obtains (determines) the timing at which the workpiece 500 (see FIG. 3) reaches a predetermined position in the coating booth 200. The timing obtainer 111 notifies the operation controller 112 of the command (the operation timing) such that each robot is operated based on the obtained (determined) timing.

The operation controller 112 operates each robot based on the command from the timing obtainer 111 and the teaching information 121. To improve the operation accuracy of each robot, the operation controller 112, for example, performs the feedback control using an encoder value in the actuator as the power source for each robot. When the operation controller 112 receives the vehicle type information indicative of the type of the workpiece 500 (see FIG. 3) from the superordinate device 300, the operation controller 112 operates each robot according to this type.

The operation controller 112 includes a determiner 112a. The determiner 112a determines whether the tip jig 40E (see FIG. 6) of the fixed-type operation robot 40 has succeeded in the locking of the open/close members provided at the front and rear portions of the workpiece 500 or not, namely, performs the determination on the lock state. Specifically, the determiner 112a determines the lock state of the open/close member by the tip jig 40E based on the output from the power source such as the actuator 40d, which turns the tip jig 40E. That is, when the output torque from the power source such as the actuator 40d to turn the tip jig 40E is larger than the predetermined value, the determiner 112a determines that the locking of the open/close member has succeeded. The output torque may be detected by a torque sensor or may be detected based on a value converted from a torque command value and/or an electric current value of the power source.

The teaching information 121 is created at a teaching stage that teaches the operation to each robot. The teaching information 121 is information including a "job" as a program to specify an operation route of each robot. As described above, the coating system 1 uses the paired robots with the arm configurations symmetrical to one another and further the respective robots are disposed at the positions symmetrical with respect to the conveying device 210 (see FIG. 2). This allows using the teaching data for each robot and the inverted teaching data. Accordingly, the coating system 1 can restrain the labor and the cost taken to create the teaching information 121 including such teaching data.

Figure 10:
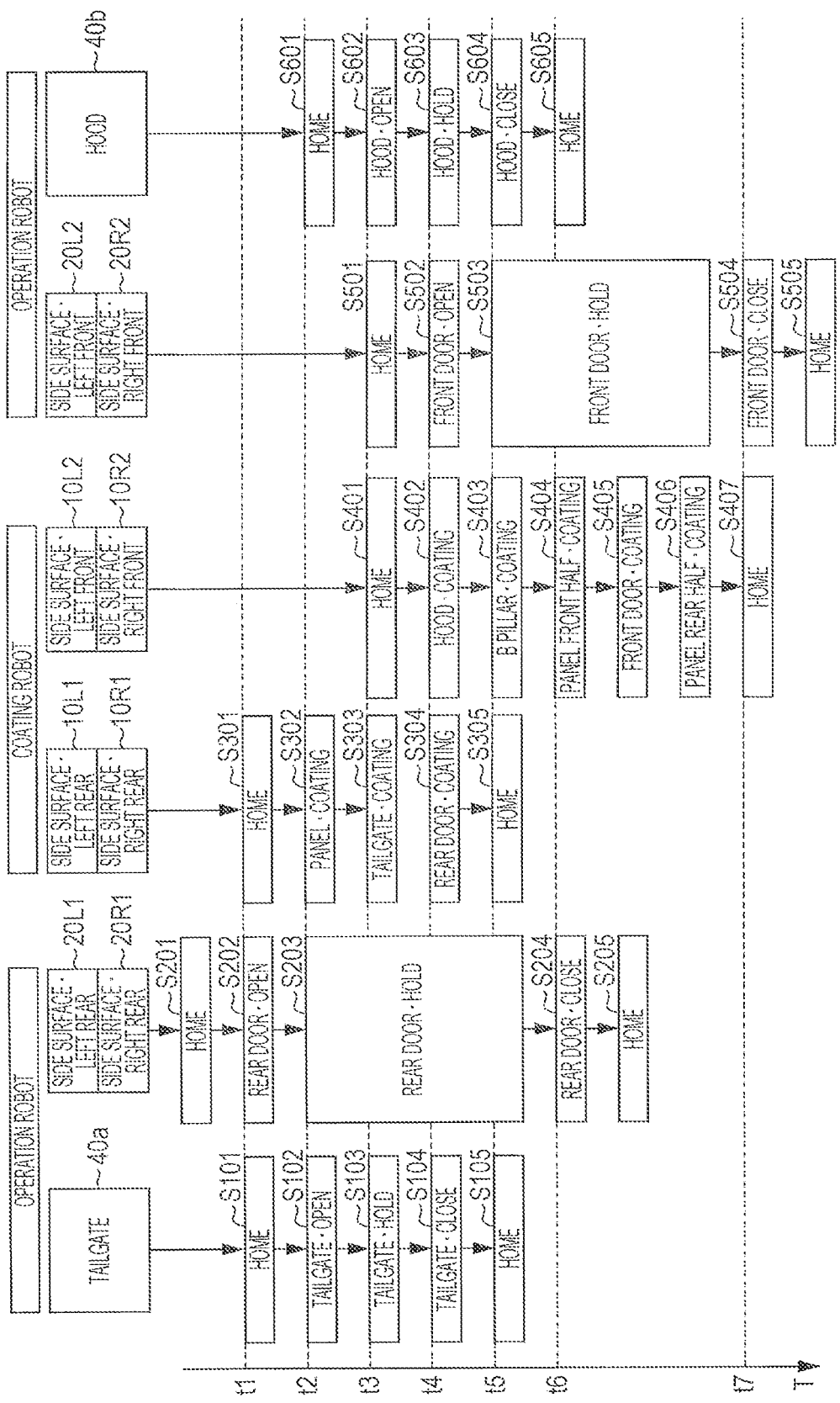
FIG. 10 is a sequence diagram illustrating an operating procedure of the coating system.

The following describes an operation procedure of the coating system 1 with reference to FIG. 10. FIG. 10 is a sequence diagram illustrating the operation procedure of the coating system 1. "HOME" illustrated in this diagram is an abbreviation of "HOME POSITION," and represents a standby posture or a standby position of the respective robots. The vertical axis in this diagram represents a time (T). The time passes along a direction of an arrow indicated in the vertical axis.

The following describes the operation procedure of the coating system 1 using the respective robots illustrated in FIG. 2 and the workpiece 500 illustrated in FIG. 3. The following describes, first, the coating procedure of the rear half of the workpiece 500 in association with the opening and closing of the tailgate (530 in FIG. 3) and the rear doors (510RR and 510LR in FIG. 3) of the workpiece 500. Next, the following describes the coating procedure of the front half of the workpiece 500 in association with the opening and closing of the hood (520 in FIG. 3) and the front doors (510RF and 510LF in FIG. 3).

First, the following describes the coating procedure of the rear half. As illustrated in FIG. 10, the mobile operation robots 20R1 and 20L1 wait in their home positions (step S201), and at a timing t1, the respective rear doors of the workpiece 500 are opened (step S202). At the timing t1, the fixed-type operation robot 40a is waiting in its home position (step S101), and the coating robots 10R1 and 10L1 are also waiting in their home positions (step S301).

The fixed-type operation robot 40a opens the tailgate of the workpiece 500 at a timing t2 (step S102), and by changing the posture of the arm following the conveyed workpiece 500, holds the tailgate open (step S103). In the process procedure at step S102, the determiner 112a (see FIG. 9) of the operation controller 112 may determine whether the fixed-type operation robot 40a has succeeded in the locking of the tailgate in the workpiece 500 or not. When the determiner 112a determines that the fixed-type operation robot 40a has failed the locking, the operation controller 112 may repeat the locking operation by the fixed-type operation robot 40a by predetermined number of times. On the other hand, the mobile operation robots 20R1 and 20L1, in a holding state where the rear doors are open, move to the conveyance direction following the conveyed workpiece 500 (step S203).

The coating robots 10R1 and 10L1 coat the side surface panels opened by opening the rear doors (step S302). Next, the coating robots 10R1 and 10L1 coat the inside of the open tailgate (step S303). Next, the coating robots 10R1 and 10L1 coat the insides of the open rear doors (step S304). The coating robots 10R1 and 10L1 return to the home positions after the coating at step S304 has been completed (step S305).

The fixed-type operation robot 40a closes the tailgate of the workpiece 500 at a timing t4 after the timing when the coating of the tailgate by the coating robots 10R1 and 10L1 has been completed (step S104). The fixed-type operation robot 40a returns to the home position after the process at step S104 has been completed (step S105).

On the other hand, the mobile operation robots 20R1 and 20L1 close the respective rear doors of the workpiece 500 at a timing t6 after the timing when the coating of the insides of the rear doors by the coating robots 10R1 and 10L1 has been completed (step S204). After the process at step S204 has been completed, the mobile operation robots 20R1 and 20L1 move to the direction opposite to the conveyance direction of the workpiece 500, thus returning to the home positions (step S205).

As described above, the rear doors of the workpiece 500 are opened at the timing t1 and closed at the timing t6. On the other hand, the tailgate of the workpiece 500 is opened at the timing t2 later than the timing t1, and closed at the timing t4 earlier than the timing t6. That is, open periods of the tailgate and the rear doors overlap with one another.

Thus, since the period during which the front/rear open/close members are open overlaps with the period during which the side surface open/close members are open, the coating process can be performed in a short time. FIG. 10 illustrates the case where the tailgate is closed before the rear doors of the workpiece 500 are closed. Instead of this, in the coating process, the tailgate may be closed after the rear doors are closed.

The following describes the coating procedure of the front half. As illustrated in FIG. 10, the fixed-type operation robot 40b waits in the home position (step S601), and at the timing t3, opens the hood of the workpiece 500 (step S602). The fixed-type operation robot 40b holds the hood open by changing the posture of the arm following the conveyed workpiece 500 (step S603). In the process procedure at step S602, the determiner 112a (see FIG. 9) of the operation controller 112 may determine whether the fixed-type operation robot 40b has succeeded in the locking of the hood in the workpiece 500 or not. When the determiner 112a determines that the fixed-type operation robot 40b has failed the locking, the operation controller 112 may repeat the locking operation by the fixed-type operation robot 40b by predetermined number of times.

At the timing t3, the mobile operation robots 20R2 and 20L2 are waiting in their home positions (step S501), and the coating robots 10R2 and 10L2 are also waiting in their home positions (step S401).

On the other hand, the mobile operation robots 20R2 and 20L2 open the respective front doors of the workpiece 500 at the timing t4 (step S502). The mobile operation robots 20R2 and 20L2, in a holding state where the front doors are open, move to the conveyance direction following the conveyed workpiece 500 (step S503). In FIG. 10, a timing when the mobile operation robots 20R2 and 20L2 open the respective front doors of the workpiece 500 and a timing when the fixed-type operation robot 40a closes the tailgate of the workpiece 500 are both the timing t4. However, it is not necessary to match both timings.

The coating robots 10R2 and 10L2 coat the inside of the open hood (step S402). Next, the coating robots 10R2 and 10L2 coat the B pillars (502 in FIG. 3) opened by opening the rear doors and the front doors (step S403). Next, the coating robots 10R2 and 10L2 coat front parts of the side surface panels opened by opening the front doors (step S404).

Next, the coating robots 10R2 and 10L2 coat the insides of the open front doors (step S405). Then, the coating robots 10R2 and 10L2 coat rear parts of the side surface panels (step S406). The coating robots 10R2 and 10L2 return to the home positions after the process at step S406 has been completed (step S407).

The fixed-type operation robot 40b closes the hood of the workpiece 500 at a timing t5 after the timing when the coating of the hood by the coating robots 10R2 and 10L2 has been completed (step S604). The fixed-type operation robot 40b returns to the home position after the process at step S604 has been completed (step S605).

On the other hand, the mobile operation robots 20R2 and 20L2 close the respective front doors of the workpiece 500 at a timing t7 after the timing when the coating of the rear parts of the side surface panels by the coating robots 10R2 and 10L2 has been completed (step S504). Then, after the process at step S504 has been completed, the mobile operation robots 20R2 and 20L2 move to the direction opposite to the conveyance direction of the workpiece 500, thus returning to the home position (step S505).

As described above, the rear doors of the workpiece 500 are opened at the timing t1 and closed at the timing t6. On the other hand, the front doors of the workpiece 500 are opened at the timing t4 later than the timing t1 and closed at the timing t7 later than the timing t6. That is, open periods of the front doors and the rear doors overlap with one another.

Thus, since the period during which the front doors are open overlaps with the period during which the rear doors are open, the coating in the state where both doors are open can be performed. In view of this, the coating on preferable portions (for example, the B pillar 502 in FIG. 3) can be properly performed. By overlapping both periods with one another, the coating process can be performed in a short time.

As described above, the front doors of the workpiece 500 are opened at the timing t4 and closed at the timing t7. On the other hand, the hood of the workpiece 500 is opened at the timing t3 earlier than the timing t4 and closed at the timing t5 earlier than the timing t7. That is, open periods of the hood and the front doors overlap with one another.

Thus, since the period during which the front/rear open/close members are open overlaps with the period during which the side surface open/close members are open, the coat process can be performed in a short time. FIG. 10 illustrates the case where the hood is closed before the front doors of the workpiece 500 are closed. Instead of this, in the coating process, the hood may be closed after the front door is closed.

As described above, the coating system 1 according to this embodiment includes the plurality of coating robots 10 and fixed-type operation robots 40. The coating robots 10 are fixed in the coating booth 200 to coat the vehicle (the workpiece 500) conveyed in the predetermined conveyance direction. The fixed-type operation robot 40 is fixed in the coating booth 200 on the upstream side or the downstream side of the plurality of coating robots 10 in the conveyance direction. The fixed-type operation robot 40 operates the open/close member provided on the front or the rear portion in the vehicle (the workpiece 500). The fixed-type operation robot 40 includes the first arm 41, which turns around the vertical axis.

Thus, with the coating system 1 according to this embodiment, since the coating robot 10 is less likely to interfere with the fixed-type operation robot 40, the respective robots can be compactly arranged. Accordingly, the installation space as the entire coating system 1 can be reduced.

In the coating system 1 according to this embodiment, the case where the mobile operation robots 20 are provided by two on the right side and the left side of the conveying device 210 is described. Instead of this, the mobile operation robots 20 may be provided by one on each side. In this case, with the workpiece 500 of a so-called four-door vehicle, the mobile operation robots 20 perform the operation that opens the front doors after closing the rear doors. With the workpiece 500 of a so-called two-door vehicle, it is sufficient to arrange the mobile operation robots 20 by one on each side.

Figure 11:
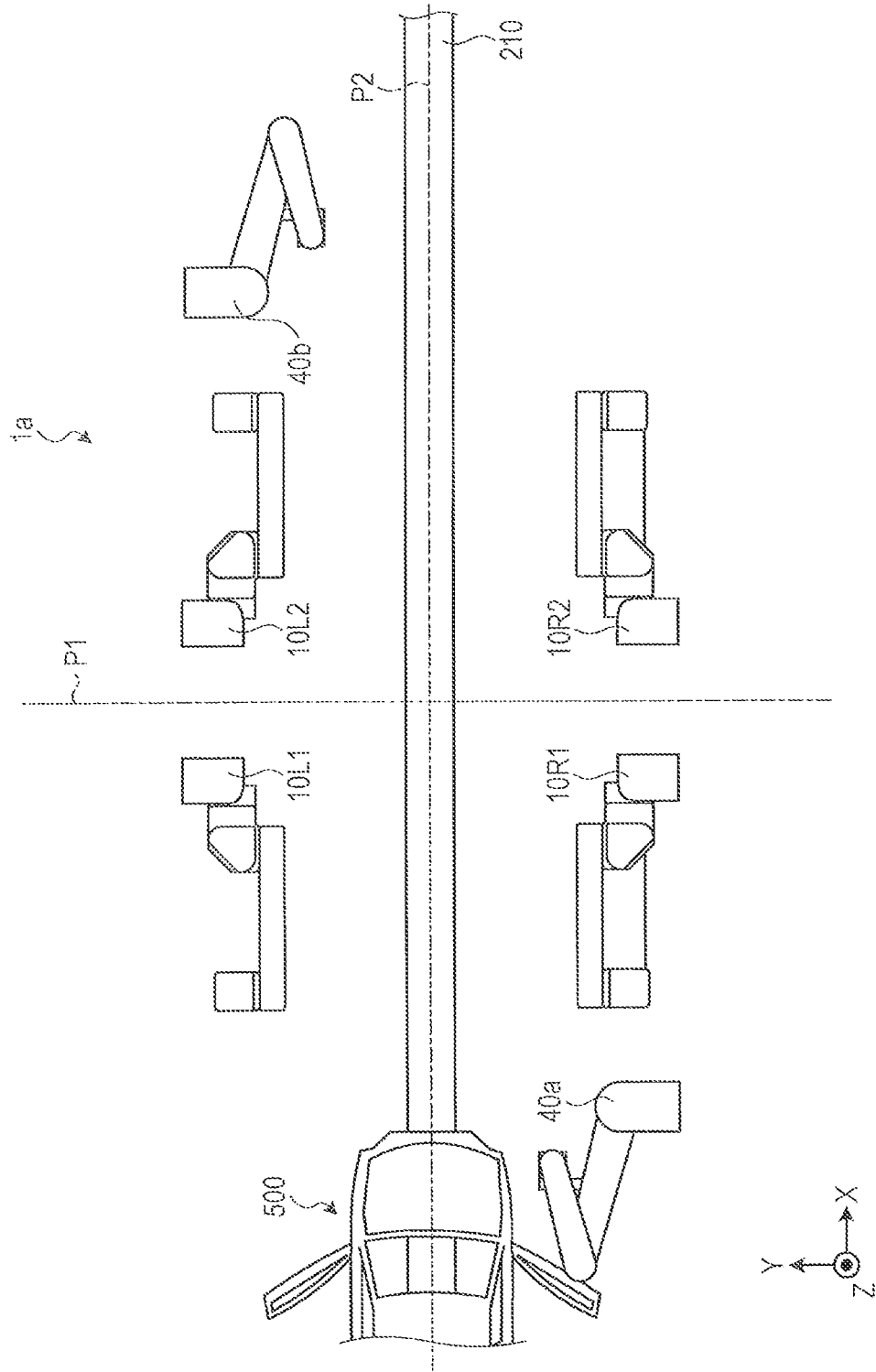
FIG. 11 is a top surface pattern diagram of a coating system according to a first modification.

Next, the following describes a coating system 1a according to a first modification with reference to FIG. 11. FIG. 11 is a top-surface pattern diagram of the coating system 1a according to the first modification. The coating system 1a illustrated in FIG. 11 has a configuration where the mobile operation robot 20, the traveler 30, and the guide 31 are omitted from the coating system 1 illustrated in FIG. 2. In FIG. 11, like reference numerals designate configurations common to those in FIG. 2, and will not be further elaborated here.

As illustrated in FIG. 11, the doors on the side surfaces of the workpiece 500 are fixed in an open state using jigs or the like. In such a case, the mobile operation robots 20 illustrated in FIG. 2 are unnecessary. That is, when the opening and closing of the doors on the side surfaces of the workpiece 500 are unnecessary, the robots in the coating system 1a can be limited to the coating robots 10 and the fixed-type operation robots 40.

FIG. 11 illustrates the case of the four coating robots 10. Instead of this, two or more of any number of coating robots 10 may be provided. In the coating system 1a illustrated in FIG. 11, the fixed-type operation robots 40 are provided by one on each upstream side and downstream side of the coating robot 10 group. Instead of this, any one of the fixed-type operation robots 40 may be omitted.

Figure 12:
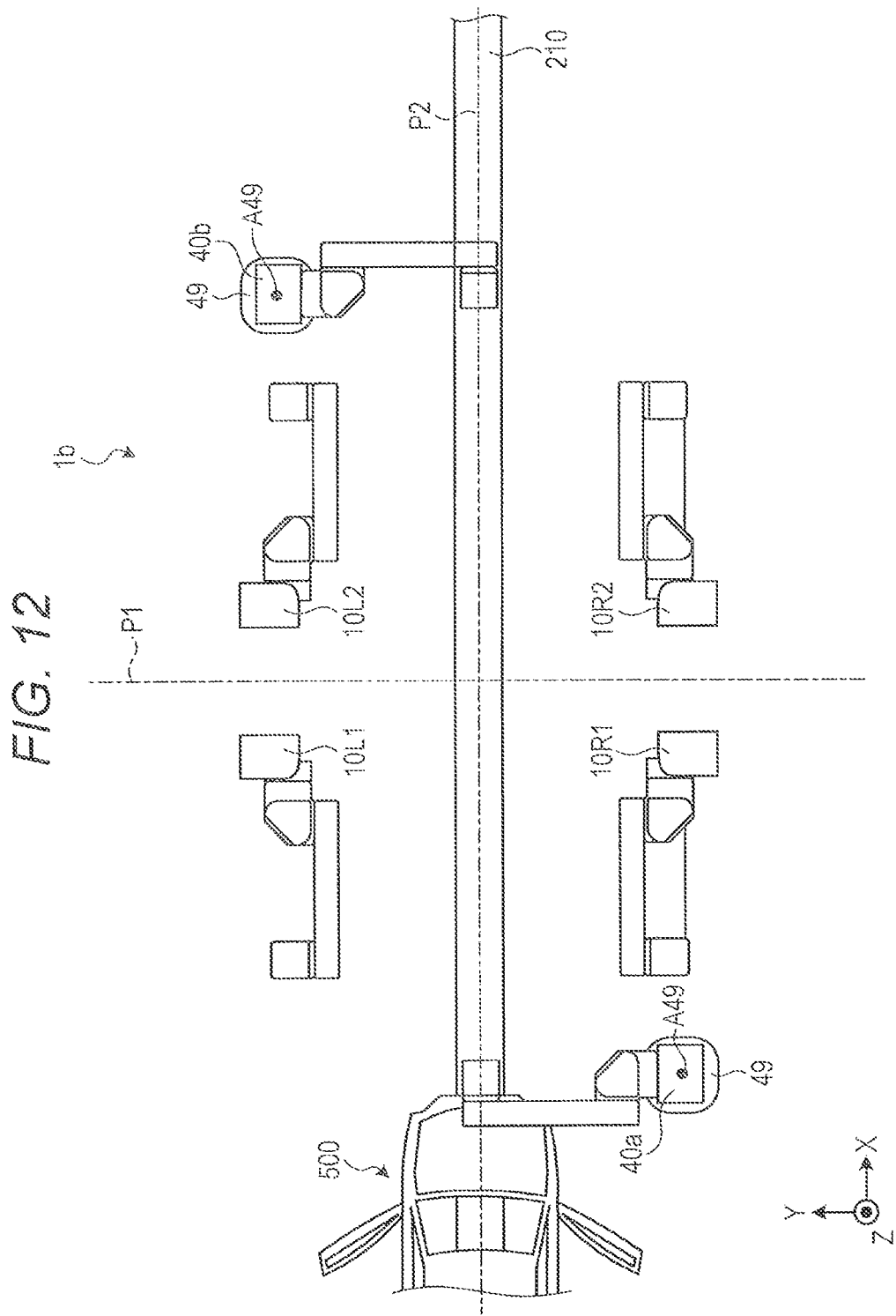
FIG. 12 is a top surface pattern diagram of a coating system according to a second modification.

Next, the following describes a coating system 1b according to a second modification with reference to FIG. 12. FIG. 12 is a top-surface pattern diagram of the coating system 1b according to the second modification. The coating system 1b illustrated in FIG. 12 has a configuration that is the configuration of the coating system 1a illustrated in FIG. 11 and where the fixed-type operation robots 40 are changed from the robots illustrated in FIG. 6 to the robots illustrated in FIG. 4.

As illustrated in FIG. 12, the fixed-type operation robot 40 is the robot having the arm configuration similar to that of the coating robot 10 illustrated in FIG. 4. Here, the fixed-type operation robot 40 is installed on a rotating table 49 having a rotation axis A49 in the vertical direction. The rotating table 49 is fixed to the floor surface or the like of the coating booth 200 (see FIG. 1). The following designates the member including the fixed-type operation robot 40 and the rotating table 49 as the fixed-type operation robot 40.

Thus, since the fixed-type operation robot 40 has the rotation axis A49, the first arm 11 illustrated in FIG. 4 can be turned around the rotation axis A49 along the vertical axis. Accordingly, the fixed-type operation robot 40 easily takes the evacuation posture such as the home position. This ensures causing the fixed-type operation robot 40 to be less likely to interfere with the workpiece 500 and the coating robot 10.

In the fixed-type operation robots 40a, 40b illustrated in FIG. 12, when the rotation axis A49 is referred to as the first axis, the first axis A11 to the sixth axis A16 illustrated in FIG. 4 are equivalent to the second axis to the seventh axis, respectively.

Additional advantages and modifications will readily occur to those skilled in the art. Therefore, the present disclosure in its broader aspects is not limited to the specific details and representative embodiments shown and described herein. Accordingly, various modifications may be made without departing from the spirit or scope of the general inventive concept as defined by the appended claims and their equivalents.

The embodiments of this disclosure may be the following first to fourteenth coating systems and the first fixed-type operation robot.

The first coating system includes a plurality of coating robots and a fixed-type operation robot. The plurality of coating robots is fixed in a coating booth. The plurality of coating robots is configured to coat a vehicle conveyed in a predetermined conveyance direction. The fixed-type operation robot is fixed in the coating booth on an upstream side or a downstream side of the plurality of coating robots in the conveyance direction. The fixed-type operation robot is configured to operate an open/close member at a front or a rear of the vehicle. The fixed-type operation robot includes a first arm turning around a vertical axis.

In the second coating system according to the first coating system, the fixed-type operation robot further includes a second arm. The second arm has a base end side supported to a tip side of the first arm. The second arm turns around an axis parallel to the vertical axis.

In the third coating system according to the second coating system, the second arm has an arm length shorter than an arm length of the first arm.

In the fourth coating system according to the second or the third coating system, the fixed-type operation robot includes a third arm. The third arm has a base end side supported to a tip side of the second arm. The third arm rotates around an axis parallel to the vertical axis. The third arm extends downward along the axis.

In the fifth coating system according to the fourth coating system, the fixed-type operation robot includes a fourth arm, a fifth arm, and a tip jig. The fourth arm has a base end side supported to a tip side of the third arm. The fourth arm turns around an axis perpendicular to the vertical axis. The fifth arm has a base end side supported to a tip side of the fourth arm. The fifth arm turns around an axis parallel to a turning axis of the fourth arm. The tip jig has a base end side attachably/detachably supported to the fifth arm. The tip jig turns with respect to the fifth arm.

In the sixth coating system according to the fifth coating system, the fifth arm maintains a relative posture to the third arm even when the fourth arm turns with respect to the third arm.

In the seventh coating system according to the sixth coating system, the third arm internally includes a power source to turn the fourth arm and the tip jig.

In the eighth coating system according to the seventh coating system, the third arm includes an internal pressure chamber to house the power source.

In the ninth coating system according to any one of the fifth to the eighth coating systems, a direction of a turning axis of the tip jig with respect to the fifth arm is changeable by changing a mounting direction of the tip jig with respect to the fifth arm.

In the tenth coating system according to any one of the fifth to the ninth coating systems, in the tip jig, a turning axis with respect to the fifth arm is offset from a locking part that locks the open/close member in a horizontal direction. A determiner is further included. The determiner is configured to determine a lock state of the open/close member based on an output from a power source to turn the tip jig.

In the eleventh coating system according to any one of the first to the tenth coating systems, the fixed-type operation robots are installed by one on the upstream side and the downstream side such that the fixed-type operation robots are disposed across a conveying device that conveys the vehicle in the conveyance direction.

In the twelfth coating system according to any one of the first to the eleventh coating systems, at least a pair of the coating robots is installed such that the coating robots each have a first axis on an identical straight line parallel to the conveyance direction and first arms rotating around the first axes extend in a direction away from one another.

In the thirteenth coating system according to the twelfth coating system, the pair of coating robots each has an arm configuration symmetrical with respect to a surface perpendicular to the identical straight line at an intermediate position of the pair of coating robots.

In the fourteenth coating system according to the thirteenth coating system, the pair of coating robots is installed at symmetrical positions across a conveying device configured to convey the vehicle in the conveyance direction. The coating robots at diagonally opposite positions mutually have the identical arm configurations.

The first fixed-type operation robot includes a base, a first arm, a second arm, a third arm, a fourth arm, a fifth arm, and a tip jig. The base is fixed to an inside of a coating booth. The first arm has a base end portion supported to the base. The first arm turns around a first axis in a vertical direction. The second arm has a base end side supported to a tip side of the first arm. The second arm turns around a second axis parallel to the first axis. The third arm has a base end side supported to a tip side of the second arm. The third arm rotates around a third axis parallel to the second axis. The third arm extends downward along the third axis. The fourth arm has a base end side supported to a tip side of the third arm. The fourth arm turns around a fourth axis perpendicular to the third axis. The fifth arm has a base end side supported to a tip side of the fourth arm. The fifth arm turns around a fifth axis parallel to the fourth axis. The tip jig is attachably/detachably fixed to the fifth arm. The tip jig operates an open/close member at a front or a rear in a vehicle conveyed in a predetermined conveyance direction in the coating booth.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A coating system comprising:
   a plurality of coating robots provided in a coating booth and configured to coat a vehicle conveyed in a conveyance direction; and
   an operation robot provided in the coating booth on an upstream side or a downstream side of the plurality of coating robots in the conveyance direction, the operation robot being configured to operate an open/close member provided at a front or a rear portion of the vehicle, the operation robot comprising:
   a first arm configured to turn around a first axis along a vertical direction;
   a second arm having a base end side supported at a tip side of the first arm, the second arm being configured to turn around a second axis parallel to the first axis;
   a third arm having a base end side supported at a tip side of the second arm, the third arm being configured to turn around a third axis parallel to the first axis, the third arm extending downward along the third axis;
   a fourth arm having a base end side supported at a tip side of the third arm, the fourth arm being configured to turn around a fourth axis perpendicular to the first axis;
   a fifth arm having a base end side supported at a tip side of the fourth arm, the fifth arm being configured to turn around a fifth axis parallel to the fourth axis; and
   a tip jig having a base end side attachably/detachably supported at the fifth arm, said tip jig being configured to operate the open/close member, the tip jig being configured to turn around a sixth axis with respect to the fifth arm, the sixth axis being selectively parallel to the fifth axis or perpendicular to a plane which includes the fourth axis and the fifth axis, wherein a direction of the sixth axis of the tip jig with respect to the fifth arm is changeable by changing a mounting direction of the tip jig with respect to the fifth arm; wherein angle of the tip jig to the open/close member is changeable.

2. The coating system according to claim 1, wherein the second arm has an arm length shorter than an arm length of the first arm.

3. The coating system according to claim 1, wherein the fifth arm maintains a relative posture to the third arm even when the fourth arm turns with respect to the third arm.

4. The coating system according to claim 3, wherein the third arm internally includes a power source to turn the fourth arm and the tip jig.

5. The coating system according to claim 4, wherein the third arm includes an internal pressure chamber to house the power source.

6. The coating system according to claim 5, wherein the tip jig includes a locking part that locks the open/close member,
   the tip jig has the sixth axis with respect to the fifth arm offset from the locking part in a horizontal direction, and
   the coating system further includes a determiner configured to determine a lock state of the open/close member by the tip jig based on an output from a power source to turn the tip jig.

7. The coating system according to claim 1, further comprising
   a conveying device that conveys the vehicle in the conveyance direction, wherein
   one of the operation robots is installed on the upstream side and another of the operation robots is installed on the downstream side of the plurality of coating robots such that the operation robots are disposed across the conveying device.

8. The coating system according to claim 1, wherein
the plurality of coating robots includes at least a pair of coating robots, the coating robots having a first axis and a first arm that rotates around the first axis, and
the pair of coating robots is installed such that the respective first axes are positioned on an identical straight line parallel to the conveyance direction and the respective first arms extend in a direction away from one another.

9. The coating system according to claim 8, wherein
the pair of coating robots has an arm configuration symmetrical with respect to a surface perpendicular to the identical straight line at an intermediate position of the pair of coating robots.

10. The coating system according to claim 9, further comprising
a conveying device configured to convey the vehicle in the conveyance direction, wherein
the pair of coating robots is installed at symmetrical positions across the conveying device.

11. The coating system according to claim 1, wherein the plurality of coating robots are fixed in the coating booth.

12. The coating system according to claim 1, wherein the operation robot is fixed in the coating booth.

\* \* \* \* \*